US008830326B2

(12) United States Patent
Kitagawa

(10) Patent No.: US 8,830,326 B2
(45) Date of Patent: Sep. 9, 2014

(54) IMAGE TRANSMISSION APPARATUS, IMAGE TRANSMISSION METHOD, PROGRAM, AND STORAGE MEDIUM

(75) Inventor: Eiichiro Kitagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1413 days.

(21) Appl. No.: 11/626,284

(22) Filed: Jan. 23, 2007

(65) Prior Publication Data
US 2007/0188621 A1 Aug. 16, 2007

(30) Foreign Application Priority Data

Feb. 16, 2006 (JP) ................. 2006-039572

(51) Int. Cl.
H04N 7/18 (2006.01)
H04N 5/232 (2006.01)
H04N 1/333 (2006.01)
H04N 101/00 (2006.01)
H04N 1/00 (2006.01)

(52) U.S. Cl.
CPC ............ *H04N 5/232* (2013.01); *H04N 2101/00* (2013.01); *H04N 2201/0075* (2013.01); *H04N 5/23245* (2013.01); *H04N 2201/001* (2013.01); *H04N 1/00204* (2013.01); *H04N 5/23206* (2013.01); *H04N 1/33323* (2013.01); *H04N 2201/0058* (2013.01); *H04N 2201/33342* (2013.01); *H04N 2201/0039* (2013.01); *H04N 2201/0084* (2013.01); *H04N 1/00127* (2013.01)
USPC ....................................................... 348/159

(58) Field of Classification Search
CPC ................................................ H04N 5/23245
USPC ....................................................... 348/159
See application file for complete search history.

(56) References Cited

U.S. PATENT DOCUMENTS

| 6,618,074 | B1* | 9/2003 | Seeley et al. | 348/143 |
| 6,680,748 | B1* | 1/2004 | Monti | 348/220.1 |
| 6,937,273 | B1* | 8/2005 | Loui | 348/220.1 |
| 6,970,183 | B1* | 11/2005 | Monroe | 348/143 |
| 7,023,913 | B1* | 4/2006 | Monroe | 375/240.01 |
| 2002/0097322 | A1* | 7/2002 | Monroe et al. | 348/159 |
| 2003/0169278 | A1* | 9/2003 | Obrador | 345/629 |
| 2003/0177500 | A1 | 9/2003 | Nakamura | |
| 2004/0008253 | A1* | 1/2004 | Monroe | 348/143 |
| 2004/0075738 | A1* | 4/2004 | Burke et al. | 348/143 |

(Continued)

FOREIGN PATENT DOCUMENTS

| JP | 10-042185 A | 2/1998 |
| JP | 2004-080256 A | 3/2004 |

*Primary Examiner* — Ario Etienne
*Assistant Examiner* — Blake Rubin
(74) *Attorney, Agent, or Firm* — Canon U.S.A., Inc. IP Division

(57) ABSTRACT

At least one exemplary embodiment is directed to an image transmission apparatus connected to an image pickup apparatus and configured to transmit an image picked up by the image pickup apparatus to a plurality of client terminals via a network. The image transmission apparatus includes a setting unit configured to set a transmission processing mode for transmitting a still image picked up by the image pickup apparatus and a real-time image picked up by the image pickup apparatus and having a resolution lower than that of the still image according to an instruction issued from one of the plurality of client terminals, and a control unit configured to control an instruction to the image pickup apparatus and a transmission processing for the still image and the real-time image according to the transmission processing mode set by the setting unit.

11 Claims, 15 Drawing Sheets

(56) References Cited

U.S. PATENT DOCUMENTS

| | | | |
|---|---|---|---|
| 2004/0233282 A1* | 11/2004 | Stavely et al. | 348/143 |
| 2004/0252193 A1* | 12/2004 | Higgins | 348/149 |
| 2005/0057650 A1* | 3/2005 | Kogane et al. | 348/143 |
| 2005/0132414 A1* | 6/2005 | Bentley et al. | 725/105 |
| 2005/0146609 A1* | 7/2005 | Creamer et al. | 348/207.1 |
| 2005/0184867 A1* | 8/2005 | Osann | 340/539.25 |
| 2005/0207487 A1* | 9/2005 | Monroe | 375/240.01 |
| 2005/0275721 A1* | 12/2005 | Ishii | 348/159 |
| 2006/0264733 A1* | 11/2006 | Masaki | 600/407 |
| 2006/0274157 A1* | 12/2006 | Levien et al. | 348/220.1 |

* cited by examiner ns; and controlling an instruction to the image pickup apparatus and a transmission processing for the still image and the real-time image according to the set transmission processing mode.

According to yet another aspect of the present invention, a computer-readable medium is provided containing computer-executable instructions for performing an image transmission with an image transmission apparatus connected to an image pickup apparatus and configured to transmit an image picked up by the image pickup apparatus to a plurality of client terminals via a network. The computer readable medium includes computer-executable instructions for setting a transmission processing mode for transmitting a still image picked up by the image pickup apparatus and a real-time image picked up by the image pickup apparatus and having a resolution lower than that of the still image according to an instruction issued from one of the plurality of client terminals; and computer-executable instructions for controlling an instruction to the image pickup apparatus and a transmission processing for the still image and the real-time image according to the set transmission processing mode.

Further features and aspects of the present invention will become apparent from the following detailed description of exemplary embodiments with reference to the attached drawings.

IMAGE TRANSMISSION APPARATUS, IMAGE TRANSMISSION METHOD, PROGRAM, AND STORAGE MEDIUM

BACKGROUND OF THE INVENTION

1. Field of the Invention

The present invention relates to an image transmission system including a cradle apparatus capable of transmitting an image captured by a general-purpose digital camera to terminals on a network.

2. Description of the Related Art

Conventionally, there is a network camera system that can transmit, to terminals on a network, a video image photographed by a camera capable of controlling zooming attached to a motor-driven panhead capable of controlling panning and tilting. Such a network camera system transmits an image according to a request from a client apparatus and controls panning, tilting, and zooming operations to be performed by the camera.

Japanese Patent Application Laid-Open No. 2004-080256 discusses a cradle apparatus (connection stand) on which a general-purpose digital camera is mounted to enable functions of the camera to be externally controlled.

In such a system, it is necessary to effectively process requests for transmitting images that are picked up in real time (low-resolution moving images used for monitoring) and requests for shooting high-resolution still images for storage, which are issued from a plurality of client apparatuses.

More specifically, when requests from a plurality of client apparatuses are simply received, in some cases, transmission of images picked up by a camera in real time and transmission of high-resolution still images may be performed at the same time. Accordingly, in those cases, an amount of data communication may exceed a data transfer band between a camera and a cradle apparatus or a transmission band on a network. Thus, a moving image may be displayed in a jerky motion or a relatively long time may be taken to receive a still image.

SUMMARY OF THE INVENTION

According to an aspect of the present invention, an image transmission apparatus configured to be in communication with an image pickup apparatus and configured to transmit an image picked up by the image pickup apparatus to a plurality of client terminals via a network includes a setting unit configured to set a transmission processing mode for transmitting a still image picked up by the image pickup apparatus and a real-time image picked up by the image pickup apparatus and having a resolution lower than that of the still image according to an instruction issued from one of the plurality of client terminals, and a control unit configured to control an instruction to the image pickup apparatus and a transmission processing for the still image and the real-time image according to the transmission processing mode set by the setting unit.

According to another aspect of the present invention, an image transmission method is provided for an image transmission apparatus connected to an image pickup apparatus and configured to transmit an image picked up by the image pickup apparatus to a plurality of client terminals via a network. The image transmission method includes setting a transmission processing mode for transmitting a still image picked up by the image pickup apparatus and a real-time image picked up by the image pickup apparatus and having a resolution lower than that of the still image according to an instruction issued from one of the plurality of client termi-

BRIEF DESCRIPTION OF THE DRAWINGS

The accompanying drawings, which are incorporated in and constitute a part of the specification, illustrate exemplary embodiments, features and aspects of the invention and, together with the description, serve to explain the principles of the invention.

DETAILED DESCRIPTION OF THE EMBODIMENTS

Various exemplary embodiments, features and aspects of the present invention will now herein be described in detail with reference to the drawings. It should be noted that the relative arrangement of the components, the numerical expressions, and numerical values set forth in these embodiments are not intended to limit the scope of the present invention unless it is specifically stated otherwise.

First Exemplary Embodiment

Figure 1:
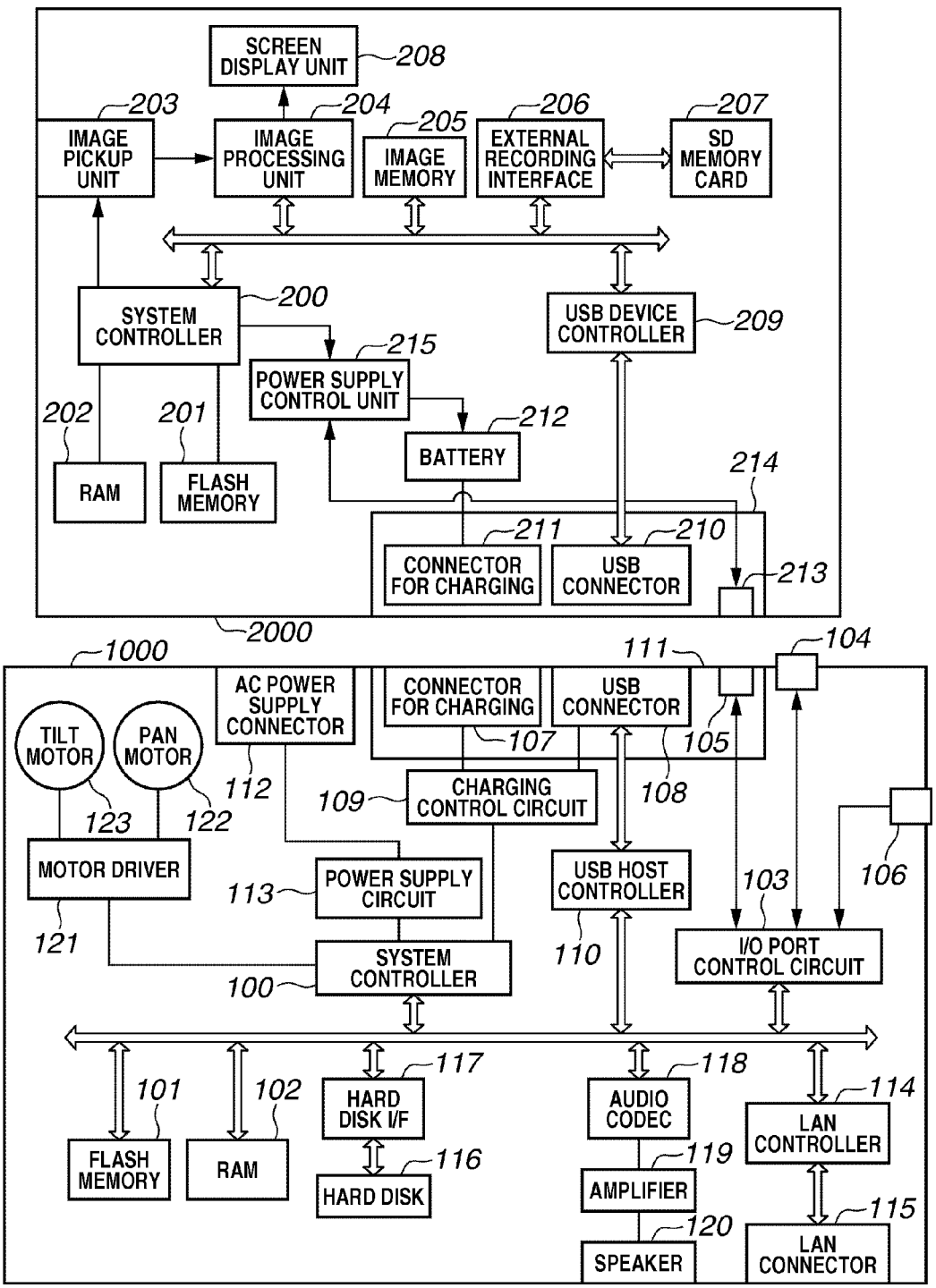
FIG. 1 illustrates a configuration of a cradle apparatus and a configuration of a digital camera according to an exemplary embodiment of the present invention.

FIG. 1 illustrates an example configuration of a cradle apparatus (image transmission apparatus) and a configuration of a digital camera (image pickup apparatus) mounted on the cradle apparatus according to an exemplary embodiment of the present invention.

Referring to FIG. 1, a cradle apparatus 1000, which functions as an image transmission apparatus, has a configuration described below. A system controller 100 controls an operation of the entire cradle apparatus 1000. A flash memory 101 stores an operation program and setting values for the system controller 100. A random access memory (RAM) 102 temporarily stores data.

An input/output (I/O) port control circuit 103 is configured to receive a detection signal generated when a digital camera is mounted on the cradle apparatus 1000, to receive an operation signal generated based on a user operation, and to output a control signal for powering on or off the mounted digital camera. A detection switch 104 detects the digital camera being mounted on the cradle apparatus 1000.

A control signal connector 105 is used to control powering on or off of the digital camera performed by the cradle apparatus 1000. A soft switch 106 is an operation member to be operated by a user when the user sends a command to the cradle apparatus 1000.

A connector for charging 107 is used to supply power for charging a battery installed in the digital camera. A universal serial bus (USB) connector 108 is used to connect to the digital camera via a USB cable to send and receive image data and a control signal for the digital camera.

A charging control circuit 109 controls current that flows through the USB cable and charging of a battery installed in the digital camera. A USB host controller 110 controls transfer of a control signal used for controlling the digital camera from the cradle apparatus 1000 and receives image data from the digital camera.

The control signal connector 105, the connector for charging 107, and the USB connector 108 constitute a connector 111 having an integrated external appearance. A power supply circuit 113 supplies power from an alternate current (AC) power source connector 112 to each unit of the cradle apparatus 1000 under the control by of system controller 100.

A local area network (LAN) controller 114 controls a communication between the cradle apparatus 1000 and a client terminal on a network. A LAN connector 115 is used to connect a network cable to the cradle apparatus 1000. The LAN connector 115 can be, for example, an RJ 45 connector. A built-in hard disk 116 is a non-volatile memory that stores image data and customization data received from the digital camera via a hard disk interface 117.

An audio codec 118 has a function for decompressing audio data. An internal speaker 120 reproduces a decompressed audio signal amplified by an amplifier 119. A motor driver 121 receives a signal from the system controller 100 to control driving of a pan motor 122 and a tilt motor 123.

In FIG. 1, a digital camera 2000 may have an example configuration as described below. A system controller 200 controls the digital camera 2000. A flash memory 201 is a non-volatile memory that stores a program for the system controller 200, user setting information, and image data and a sound file for customization. A RAM 202 temporarily stores data to be used by the system controller 200.

An image pickup unit 203 converts an optical signal into an electrical signal to generate an image signal. An image processing unit 204 digitizes an image signal input by the image pickup unit 203, performs a conversion processing including a resolution conversion and a color conversion on the image signal, and after that, performs a compression and encoding processing on the image signal. The image processing unit 204 outputs a real-time image for monitoring (a low-resolution moving image that is currently picked up) transmitted from the image pickup unit 203 to a screen display unit 208. In addition, the image processing unit 204, according to a command from the system controller 200, sends a menu image to the screen display unit 208. The screen display unit 208 includes a liquid crystal display (LCD) to display an image sent from the image processing unit 204.

A USB device controller 209 controls a communication between the digital camera 2000 and an external USB host device via a USB connector 210. A connector for charging 211 is used to supply power from the cradle apparatus 1000 to a battery 212. A connector 213 receives a control signal from the cradle apparatus 1000 for controlling powering on and off of the digital camera 2000. A power supply control unit 215 controls powering ON and OFF of the digital camera 2000 according to the power control signal from the cradle apparatus 1000 and a control signal from the system controller 200.

The USB connector 210, the connector for charging 211, and the connector 213 may constitute a connector 214 having an integrated shape.

The system controller 200 of the digital camera 2000, when mounted on the cradle apparatus 1000, communicates with the cradle apparatus 1000 via a USB cable or the like. The system controller 200, according to a command from the system controller 100 of the cradle apparatus 1000, performs shooting of a high-resolution still image and processing such as transfer of image data.

When the digital camera 2000 is individually used, still image data after shooting thereof is stored in a Secure Digital (SD) memory card 207, which is a non-volatile memory attachable and detachable to and from the digital camera 2000, via an external storage interface 206. Image data can be recorded on the SD memory card 207 according to a command from the system controller 100 of the cradle apparatus 1000.

Figure 2:
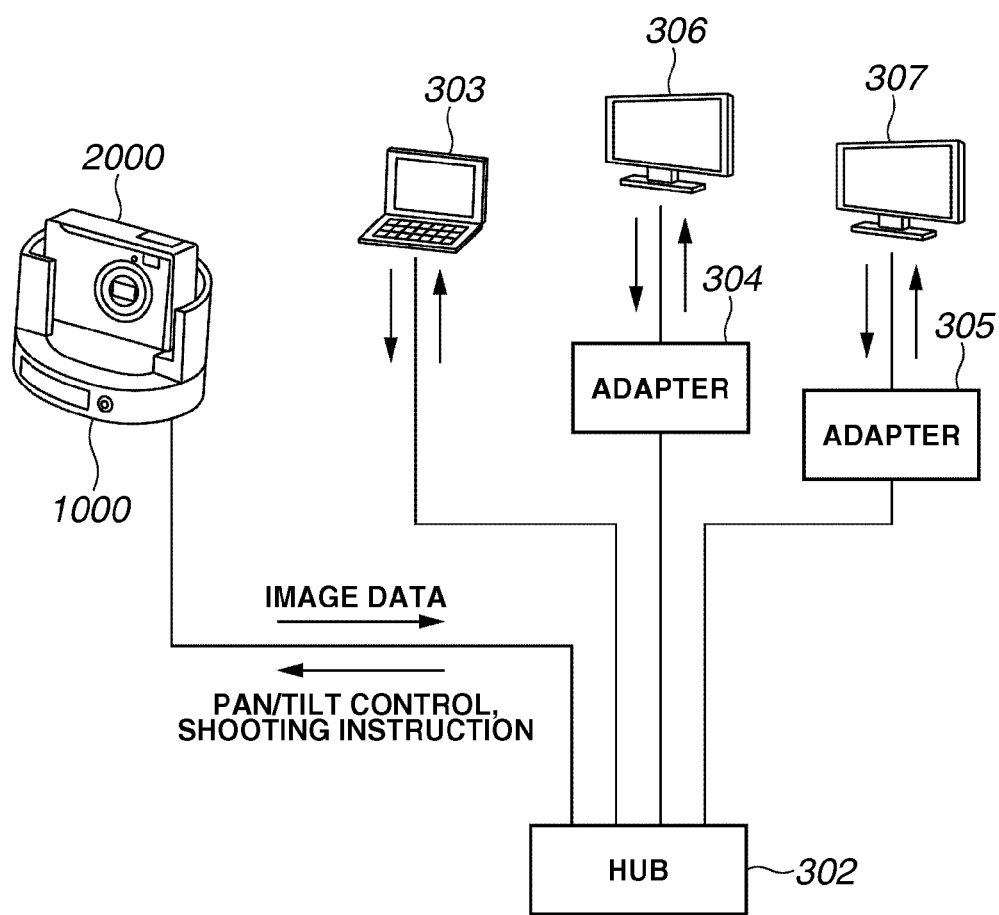
FIG. 2 illustrates a connection state of a cradle apparatus according to an exemplary embodiment of the present invention.

FIG. 2 illustrates an example of a system according to the present exemplary embodiment in which the cradle apparatus 1000 is connected to a network. The cradle apparatus 1000, a client terminal (personal computer (PC)) 303, an adapter 304, and an adapter 305 are mutually connected via a hub device 302 on the network. The client terminal 303 has a function for operating a still image shooting performed by the digital camera 2000 connected to the cradle apparatus 1000, a function for displaying a real-time image for monitoring, and a function for acquiring and displaying a still image. These functions are implemented by application software installed in the client terminal 303.

The adapters 304 and 305 have a function for receiving a user operation by receiving an infrared ray emitted from a remote controller. The adapters 304 and 305 have a function for outputting to the cradle apparatus 1000 a control signal for controlling the digital camera 2000. Additionally, the adapters 304 and 305 have a function for acquiring a real-time image for monitoring, a still image, and a stored image from the digital camera 2000 and displaying the acquired images on a television screen. The adapters 304 and 305 are respectively connected to television receiving apparatuses 306 and 307 via an image output terminal and an audio output terminal thereof to output image and audio data to the television receiving apparatuses 306 and 307. In addition, the adapters 304 and 305 each have a tuner function. The adapters 304 and 305 each perform processing for displaying an ordinary broadcast screen, displaying an operation menu for the digital camera 2000, and displaying images received from the cradle apparatus 1000 in a switching manner or in an overlapping manner.

[Exemplary Processing for Establishing a Session for Real-time Image]

The cradle apparatus 1000, when powered on, sends a packet to a given multicast address. The adapters 304 and 305 receive the packet addressed to the given multicast address and send a response to the cradle apparatus 1000. After that, the operation advances to a capacity exchange phase in which the cradle apparatus 1000 and the adapters 304 and 305 inform each other of its own service capacity. When the capacity exchange phase ends, a communication between the cradle apparatus 1000 and the adapters 304 and 305 is established.

When the digital camera 2000 is mounted on the cradle apparatus 1000, the cradle apparatus 1000 detects a connection of the digital camera 2000 thereto based on a signal from the detection switch 104. Then, a communication using a Picture Transfer Protocol (PTP) is established between the cradle apparatus 1000 and the digital camera 2000. After the communication is established between the cradle apparatus 1000 and the digital camera 2000, the cradle apparatus 1000 acquires, from the digital camera 2000, a manufacturer name, a camera model name, camera version information, and information about the digital camera 2000 including information about the functions the digital camera 2000 supports. In the present exemplary embodiment, information about the functions the mounted digital camera 2000 supports includes information about a still image shooting function and a function for sending real-time image data for monitoring.

Subsequently, the cradle apparatus 1000 compares still image data recorded by the digital camera 2000 with still image data accumulated in the hard disk 116. More specifically, the cradle apparatus 1000 makes a comparison as to a file name, date of shooting, image size, and file size of the still image data accumulated in the hard disk 116. If there remains a still image that is not stored in the hard disk 116 yet, the cradle apparatus 1000 acquires the image from the digital camera 2000 and stores the image on the hard disk 116.

When the cradle apparatus 1000 completes receiving all of the images not yet stored, the cradle apparatus 1000 sends a notification event packet for notifying the mounting of the digital camera 2000 to the adapters 304 and 305, with which connection is established. The notification event packet includes information, previously acquired from the digital camera 2000, indicating that the digital camera 2000 has a function for shooting still images and a function for sending real-time image data for monitoring.

The adapter 304 or 305, when receiving the notification event packet, recognizes that the digital camera 2000 connected to the cradle apparatus 1000 can be operated via the adapter 304 or 305. Then, the adapter 304 or 305 adds the digital camera 2000 to a list of operable cameras stored in a built-in memory.

The adapter 304 or 305 detects information about the cradle apparatus 1000 selected from the list of operable cameras according to a user operation. In response to the detection of the information about the cradle apparatus 1000, the adapter 304 or 305 starts a session for receiving a real-time image for monitoring (a moving image session) with the cradle apparatus 1000. When the moving image session starts, the adapter 304 or 305 periodically sends a request for receiving an image to the cradle apparatus 1000.

Every time the cradle apparatus 1000 receives a request for receiving an image from the adapter 304 or 305 that is opening the moving image session, the cradle apparatus 1000 sends one frame of real-time image data for monitoring acquired from the digital camera 2000 to the adapter 304 or 305.

The adapter 304 or 305 sends the received image data to the television receiving apparatus 306 or 307, respectively. By serially receiving real-time image data for monitoring and displaying the image data on the television receiving apparatus 306 or 307, a user can view a real-time image for monitoring transmitted from the cradle apparatus 1000 as a moving image.

[Exemplary Still Image Shooting Processing]

Figure 3:
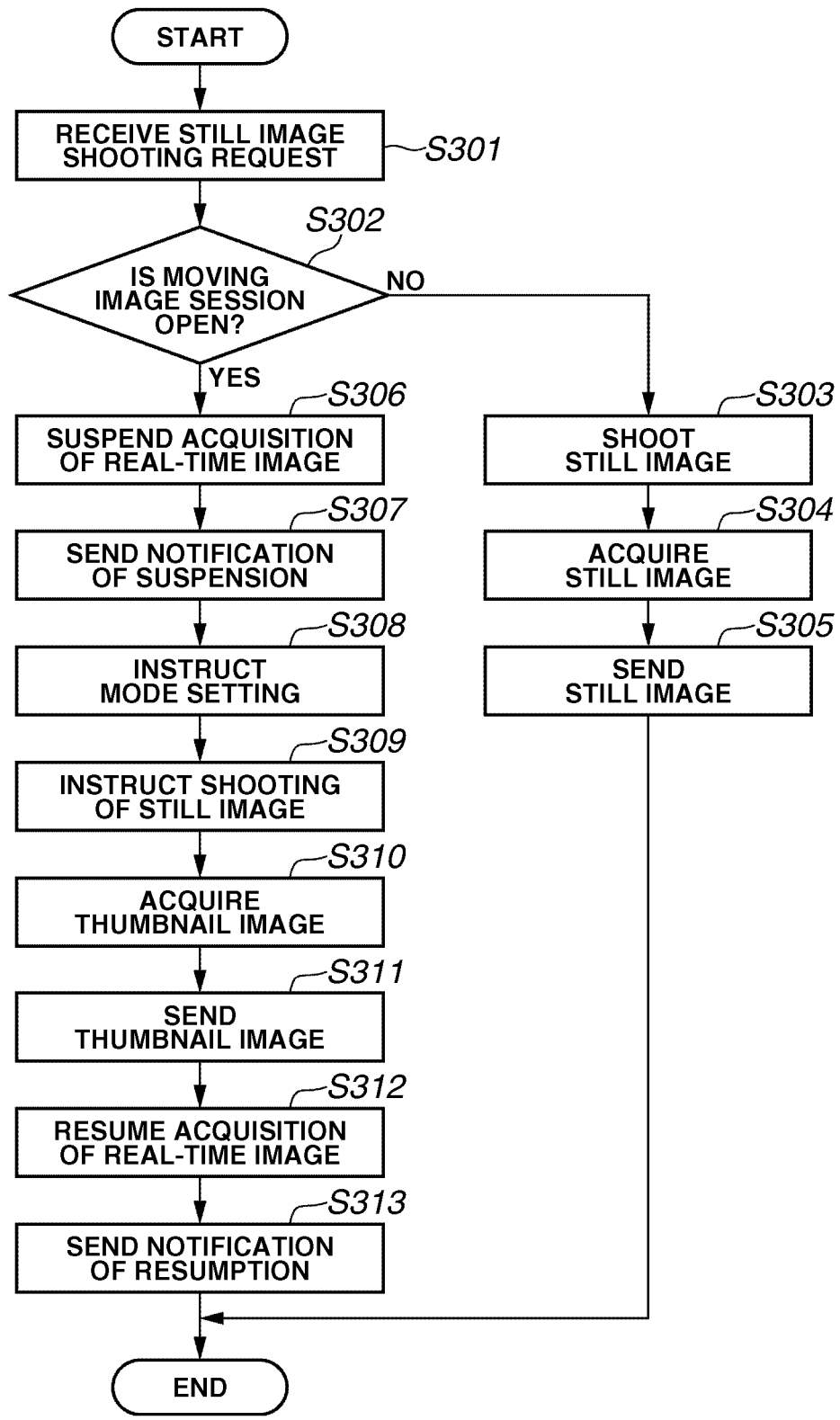
FIG. 3 is a flow chart illustrating example processing for shooting a still image performed by the cradle apparatus according to an exemplary embodiment of the present invention.

Exemplary still image shooting processing performed by the cradle apparatus 1000 according to the first exemplary embodiment is now described below with reference to FIG. 3. In the first exemplary embodiment, a photographed high-resolution still image is first recorded in the digital camera 2000. A still image to be photographed is a high-resolution image having a resolution higher than that of one frame of real-time image data for monitoring.

A user who is viewing the television receiving apparatus 306 issues an instruction for shooting a still image to the adapter 304 in order to perform shooting of a still image by the digital camera 2000. In response to the instruction, the adapter 304 sends a request for shooting a still image to the cradle apparatus 1000. Then, in step S301, the cradle apparatus 1000 receives the still image shooting request.

In step S302, the cradle apparatus 1000 checks if a moving image session is open. If it is determined that no moving image session is open, the processing advances to step S303. In step S303, the cradle apparatus 1000 immediately instructs the digital camera 2000 to shoot a still image.

In the case of shooting by an external control via a USB cable, in a default processing mode of the digital camera 2000, photographed image data is stored in a temporary storage area in the digital camera 2000.

When the still image shooting is completed, the cradle apparatus 1000 receives a notification of completion from the digital camera 2000. When the cradle apparatus 1000 receives the completion notification, the cradle apparatus 1000 acquires still image data in step S304. Then, in step S305, the cradle apparatus 1000 sends the acquired still image data to the adapter 304.

If, in step S302, it is determined that a moving image session is open, the processing advances to step S306. In step S306, the cradle apparatus 1000 temporarily suspends the processing for acquiring real-time image data for monitoring. Then, in step S307, the cradle apparatus 1000 sends a notification of suspension of the session to the adapters 304 and 305.

In step S308, the cradle apparatus 1000 issues, to the digital camera 2000, an instruction for changing a setting to a processing mode in which image data is stored in the SD memory card 207 of the digital camera 2000.

After the setting for the processing mode is changed, the cradle apparatus 1000 sends an instruction for shooting to the digital camera 2000 to perform shooting of a still image (step S309). When the shooting of a still image is completed, the cradle apparatus 1000 receives a notification of completion from the digital camera 2000.

In step S310, the cradle apparatus 1000 acquires a thumbnail image sent from the digital camera 2000 instead of a high-resolution still image. Here, a thumbnail image is in a Quarter Video Graphics Array (QVGA) size and has a resolution lower than that of a still image to be primarily acquired. In addition, a thumbnail image is in the form of image data in a small data size, which is compressed at a high compression ratio. Accordingly, thumbnail image data can be acquired in an extremely short length of time, and thus the moving image session can be promptly resumed.

In step S311, the cradle apparatus 1000 sends the acquired thumbnail image data to the adapter 304. In this processing, the data size of the thumbnail image data is small. Accordingly, the thumbnail image data can be sent to the adapter 304 via a network in a short length of time.

When the sending of thumbnail image data is completed, in step S312, the cradle apparatus 1000 resumes the moving image acquisition processing (processing for acquiring real-time image data). Then, in step S313, the cradle apparatus 1000 sends a notification of resumption of the moving image session to the adapters 304 and 305.

Figure 4:
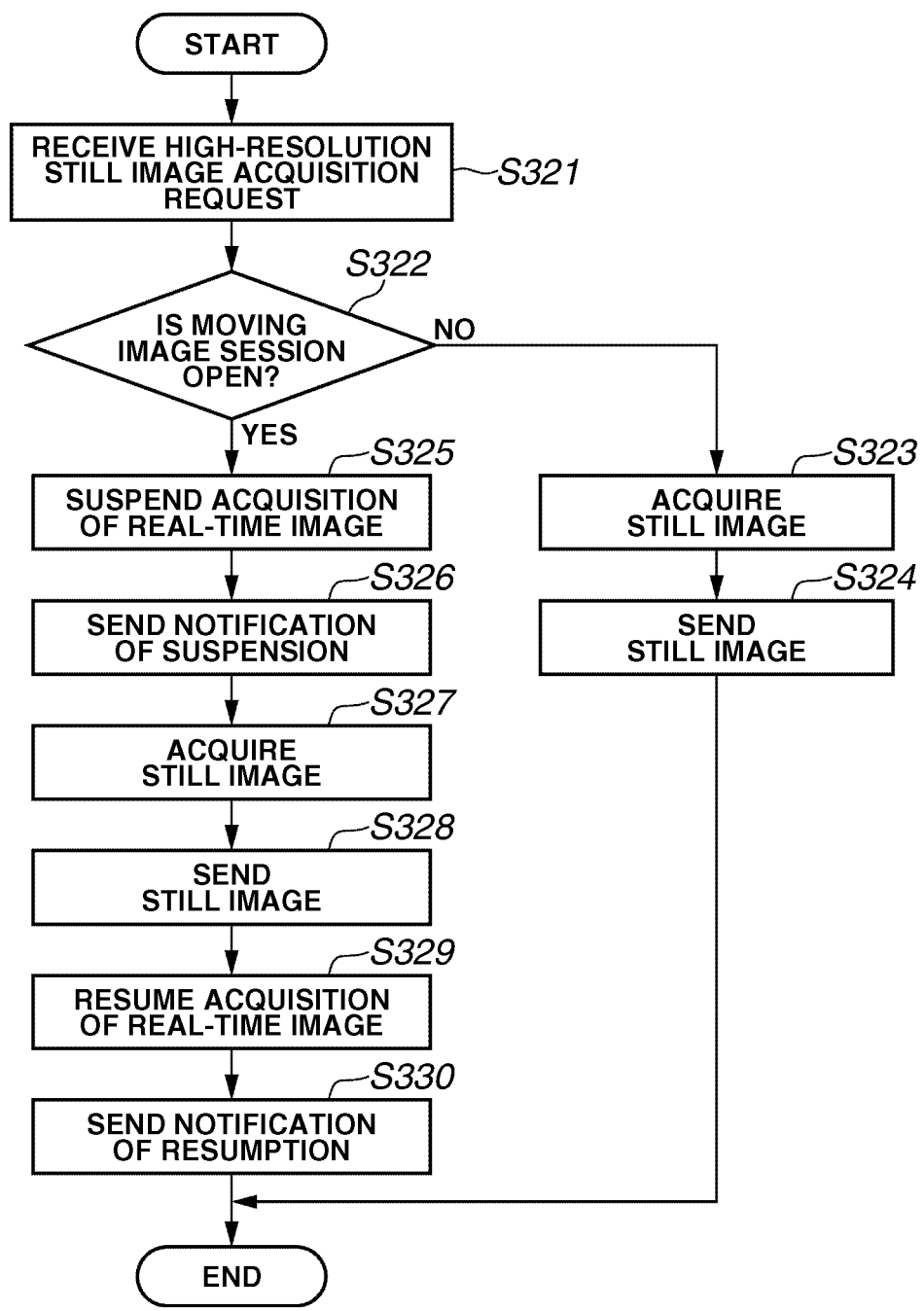
FIG. 4 is a flow chart illustrating example processing for transmitting a still image performed by the cradle apparatus according to an exemplary embodiment of the present invention.

When, after confirming the thumbnail image on the television receiving apparatus 306, the user desires to display a high-resolution image on the television receiving apparatus 306, the user can issue an instruction for acquiring and displaying a high-resolution still image. Example processing for this operation is described below with reference to FIG. 4.

The user issues an instruction for acquiring a photographed still image. When the adapter 304 detects the instruction, the adapter 304 sends a request for acquiring a high-resolution still image to the cradle apparatus 1000. When the cradle apparatus 1000 receives the request for acquiring a high-resolution still image in step S321, the cradle apparatus 1000, in step S322, checks if a moving image session for sending a real-time image for monitoring is open. If, in step S322, it is determined that no moving image session is open, then in step S323, the cradle apparatus 1000 issues an instruction to the digital camera 2000 to acquire high-resolution still image data stored in a memory area of the SD memory card 207 in the digital camera 2000. Then, in step S324, the cradle apparatus 1000 sends the acquired still image to the adapter 304.

If, in step S322, it is determined that a moving image session is open, the processing advances to step S325. In step S325, the cradle apparatus 1000 temporarily suspends the processing for acquiring a real-time image (moving image) for monitoring. Then, in step S326, the cradle apparatus 1000 sends a notification of suspension to the adapters 304 and 305. After the processing for acquiring a real-time image (moving image) for monitoring is suspended, in step S327, the cradle apparatus 1000 issues an instruction to the digital camera 2000 to acquire still image data stored in a memory area of the SD memory card 207 in the digital camera 2000. Then, in step S328, the cradle apparatus 1000 sends the acquired still image data to the adapter 304.

In step S329, when the sending of the high-resolution still image is completed, the cradle apparatus 1000 resumes processing for acquiring a real-time image (moving image) for monitoring. In step S330, the cradle apparatus 1000 sends a notification of resumption of the moving image session to the adapters 304 and 305.

Figure 5:
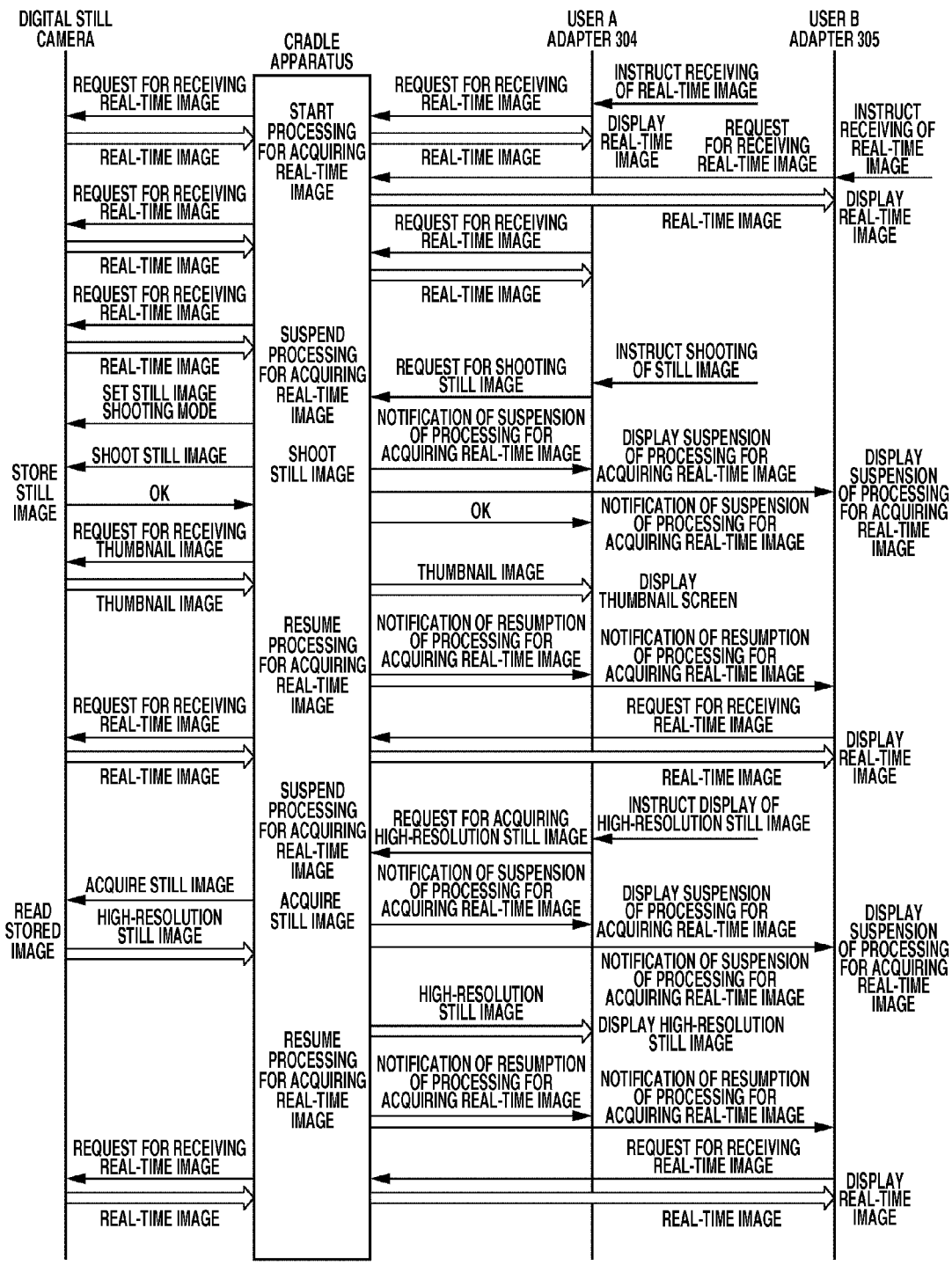
FIG. 5 illustrates an example sequence of a system according to a first exemplary embodiment of the present invention.

FIG. 5 illustrates an example of a sequence that specifically describes the processing according to the first exemplary embodiment. FIG. 5 illustrates an example of a case where a client terminal A (the television receiving apparatus 306 and the adapter 304) and a client terminal B (the television receiving apparatus 307 and the adapter 305) are in a moving image session with the cradle apparatus 1000. The example shown in FIG. 5 illustrates sending and receiving of control commands and image data among the digital camera 2000, the cradle apparatus 1000, the client terminal A, and the client terminal B in a case where, after a user operating the client terminal A issues an instruction for shooting a still image, the user confirming a real-time image for monitoring issues an instruction for displaying a high-resolution still image.

Second Exemplary Embodiment

In a second exemplary embodiment, still image data photographed during a moving image session is stored in a memory in the cradle apparatus 1000, and the cradle apparatus 1000 generates small size image data for preview based on the photographed image data and sends the small size image data to the adapter 304 or 305. Note that the configuration of the cradle apparatus 1000, the configuration of the digital camera 2000, and the processing for establishing a session for a moving image for monitoring and displaying are similar to those described in the first exemplary embodiment. Accordingly, the description thereof is not repeated here.

Figure 6:
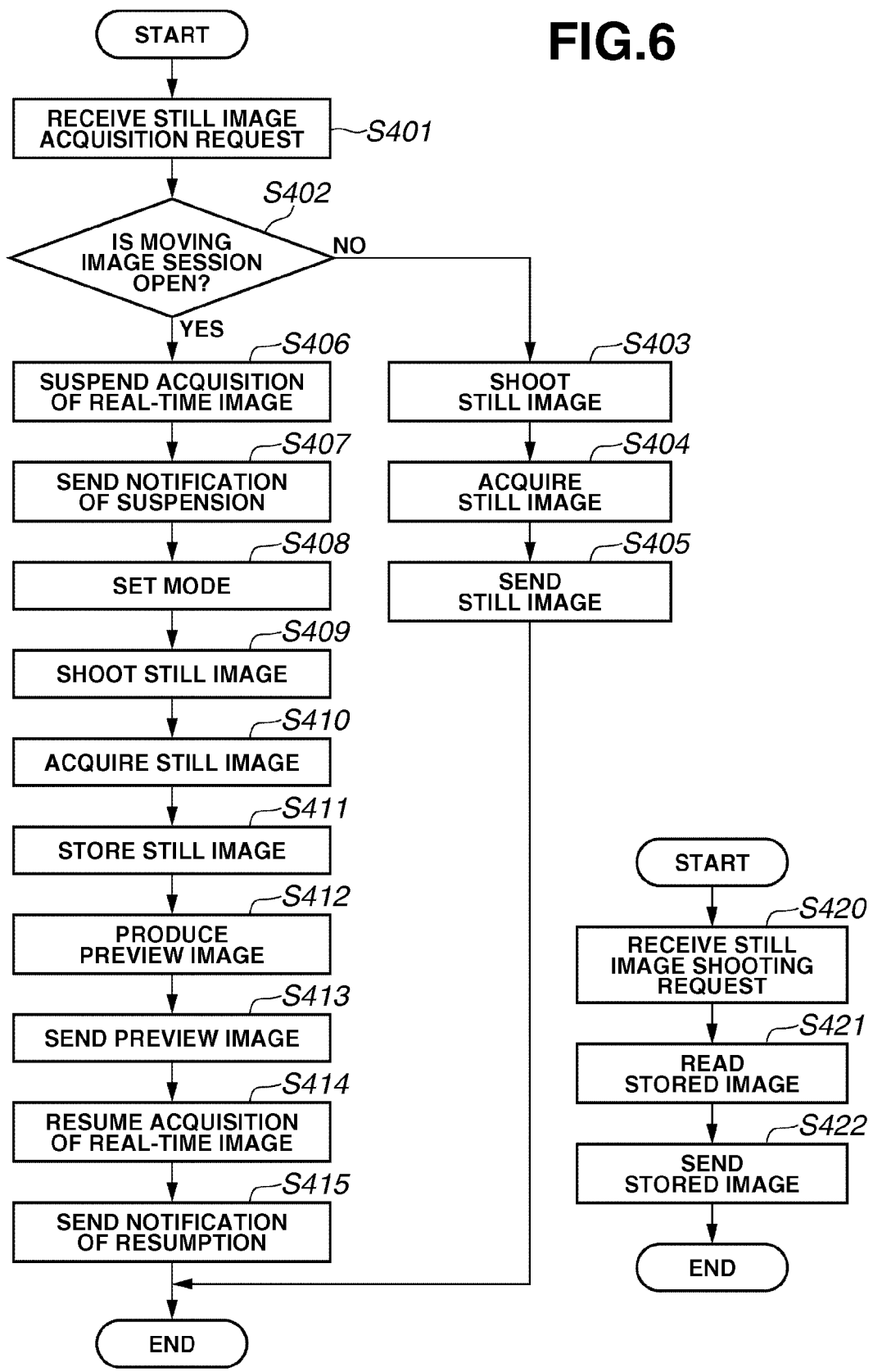
FIG. 6 is a flow chart illustrating example processing for shooting a still image performed by a cradle apparatus according to a second exemplary embodiment of the present invention.

FIG. 6 is a flow chart illustrating example processing for shooting a still image performed by the cradle apparatus 1000 according to the second exemplary embodiment. Note that the processing in step S401 through step S407 is similar to the processing in step S301 through step S307 in the first exemplary embodiment. Accordingly, the description thereof is omitted here.

Referring to FIG. 6, in step S408, after sending a notification of suspending a moving image session, the cradle apparatus 1000 issues an instruction to the digital camera 2000 for setting to a processing mode in which photographed image data is stored in a temporary storage area in the digital camera 2000. In the present exemplary embodiment, an image memory 205 (see FIG. 1) is used for the temporary storage area.

After the setting of the processing mode is changed, the cradle apparatus 1000 sends an instruction for shooting to the digital camera 2000 to allow the digital camera 2000 to perform shooting of a still image (step S409). After the shooting of a still image is completed, the cradle apparatus 1000 receives a notification of completion from the digital camera 2000.

Then, in step S410, the cradle apparatus 1000 acquires a high-resolution still image from the digital camera 2000. In the present exemplary embodiment, the digital camera 2000 and the cradle apparatus 1000 are connected via a high-speed communication cable such as a USB 2.0 cable. This is because when a capacity of the digital camera 2000 for sending data is high, high-resolution still image data can be completely acquired in a short length of time.

In step S411, the cradle apparatus 1000 stores the acquired still image data in a memory such as the hard disk 116. In step S412, The cradle apparatus 1000 generates image data having a small data size for preview (thumbnail image) based on the received still image data. If the acquired still image is a Joint Photographic Experts Group (JPEG) file, the preview image can be a thumbnail image associated with the JPEG file.

In step S413, the cradle apparatus 1000 sends the generated preview image data to the adapter 304. When the sending of the generated preview image data is completed, the cradle apparatus 1000, in step S414, resumes the acquisition of a real-time image (moving image) for monitoring. In step S415, the cradle apparatus 1000 sends a notification of resumption to the adapters 304 and 305.

Exemplary processing performed by the cradle apparatus 1000 when receiving a request for acquiring still image data from the adapter 304 or 305 is described below. When the cradle apparatus 1000 receives a request for acquiring high-resolution still image data from the adapter 304 or 305 in step S420, the cradle apparatus 1000 reads high-resolution still image data from the hard disk 116 of the cradle apparatus 1000 in step S421. In step S422, the cradle apparatus 1000 sends the read high-resolution still image data to the adapter 304 or 305 that has issued the request.

Figure 7:
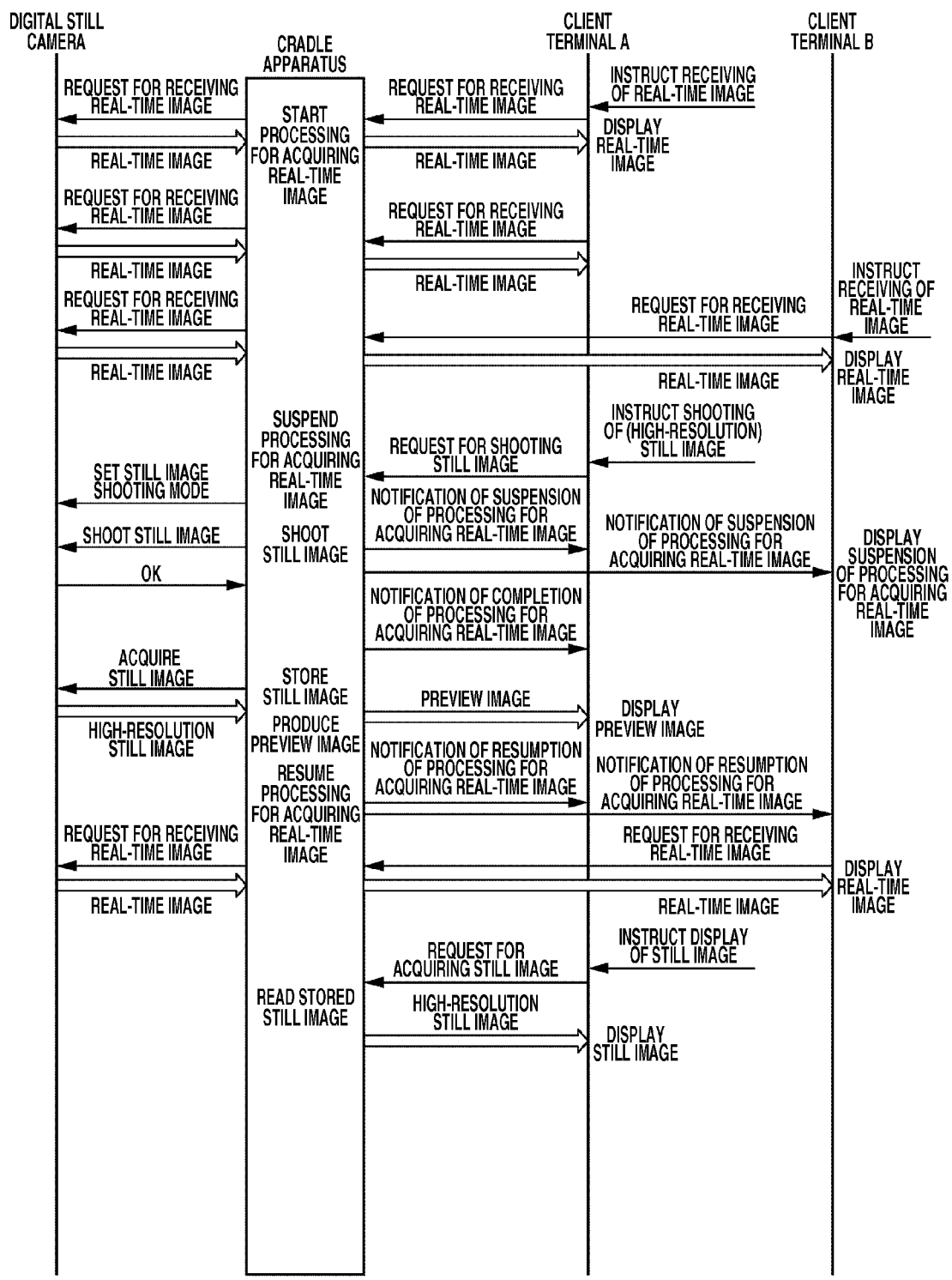
FIG. 7 illustrates an example sequence of a system according to the second exemplary embodiment of the present invention.

FIG. 7 illustrates an example of a sequence that specifically describes the processing according to the second exemplary embodiment. More specifically, FIG. 7 illustrates an example of a case where a client terminal A (the television receiving apparatus 306 and the adapter 304) and a client terminal B (the television receiving apparatus 307 and the adapter 305) are in a moving image session with the cradle apparatus 1000.

That is, the example shown in FIG. 7 illustrates sending and receiving of control commands and image data among the digital camera 2000, the cradle apparatus 1000, the client terminal A, and the client terminal B in a case where, after a user operating the client terminal A issues an instruction for shooting a still image, the user confirming a preview image issues an instruction for displaying a high-resolution still image.

In the second exemplary embodiment, when a high-resolution still image is sent to the adapter 304 or 305, the processing for acquiring a moving image is not suspended. However, the configuration is not limited to this. That is, the processing for acquiring a moving image can be suspended just as in the case of the first exemplary embodiment.

Third Exemplary Embodiment

In a third exemplary embodiment, an unoccupied time period, in which frame image data that is data of a real-time image for monitoring is not acquired from the digital camera 2000 during a moving image session, is utilized. More specifically, in the present exemplary embodiment, a moving image session between frames is not suspended, and processing for dividing one frame of a high-resolution still image is performed at a level not hindering the moving image session. Real-time image data and high-resolution divided data are time-serially sent utilizing the unoccupied time period during the moving image session. Note that the configuration of the cradle apparatus 1000, the configuration of the digital camera 2000, and the processing for establishing a session for a real time moving image for monitoring are similar to those described in the first exemplary embodiment. Accordingly, the description thereof is not repeated here.

Figure 8:
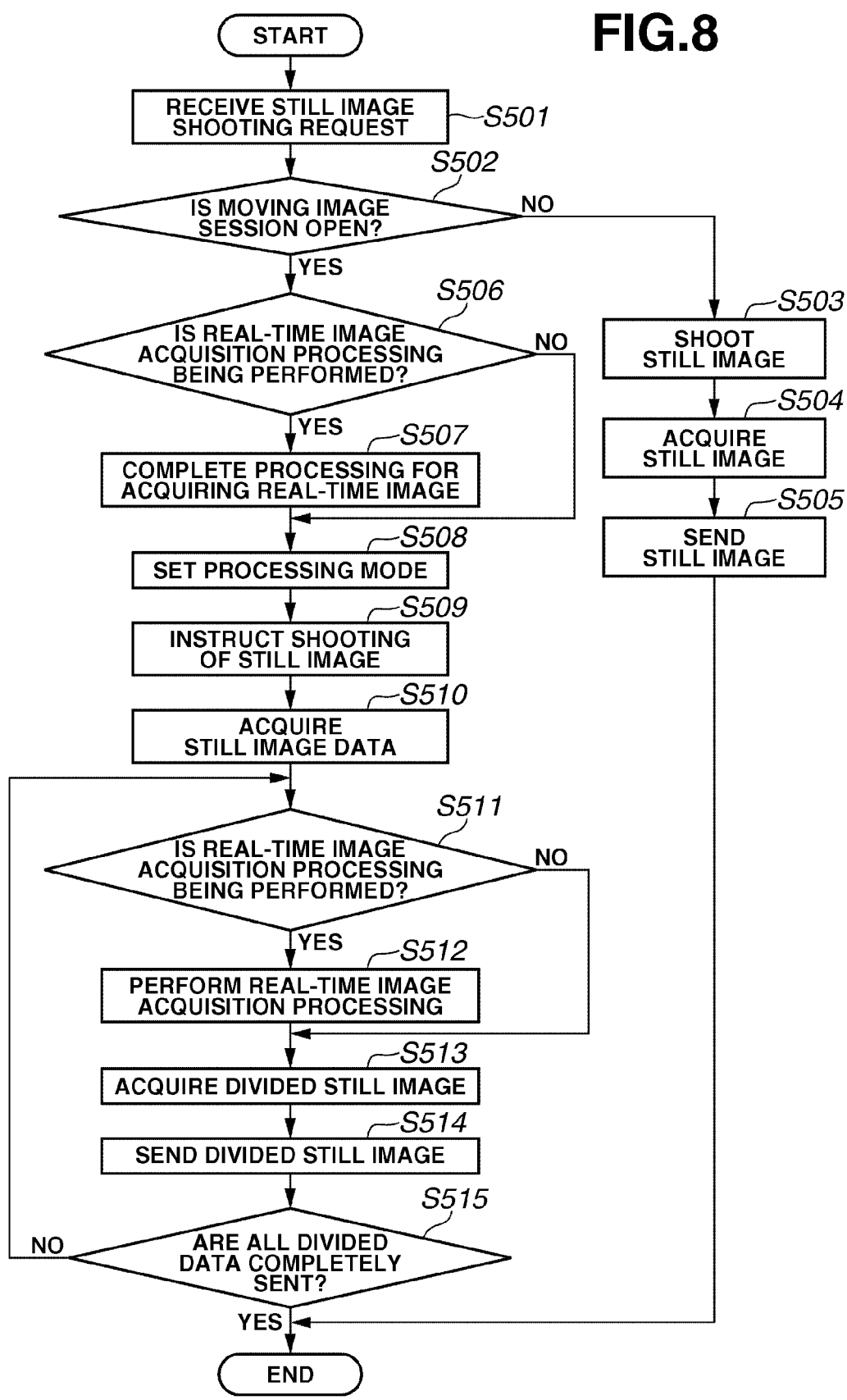
FIG. 8 is a flow chart illustrating example processing for shooting a still image performed by a cradle apparatus according to a third exemplary embodiment of the present invention.

FIG. 8 is a flow chart illustrating example processing for shooting a still image performed by the cradle apparatus 1000 according to the third exemplary embodiment. Referring to FIG. 8, in step S501, the cradle apparatus 1000 receives a request for shooting a high-resolution still image from the adapter 304 or 305. Then, in step S502, the cradle apparatus 1000 checks if a moving image session is open. If, in step S502, it is determined that no moving image session is open, the processing advances to step S503. In step S503, the cradle apparatus 1000 performs an ordinary still image shooting processing. The processing in step S503 through step S505 is similar to the processing in step S303 through step S305 according to the first exemplary embodiment. Accordingly, the description thereof is omitted here.

If, in step S502, it is determined that a moving image session is open, then in step S506, the cradle apparatus 1000 checks whether the processing for acquiring one frame of an image is currently performed. If, in step S506, it is determined that the processing for acquiring a real-time image for monitoring is currently performed in order to perform a high-resolution still image shooting processing (YES in step S506), then in step S507, the processing for acquiring a real-time image for monitoring is allowed to be completed in priority. On the other hand, if, in step S506, it is determined that no processing for acquiring one frame of an image is not currently performed, the processing advances to step S508.

In step S508, the cradle apparatus 1000 issues an instruction to the digital camera 2000 for changing a setting to a processing mode for storing high-resolution still image data in the image memory 205, which is a temporary storage area. In step S509, the cradle apparatus 1000 issues an instruction to the digital camera 2000 for shooting a still image.

In step S510, the cradle apparatus 1000 receives a notification of completion of shooting from the digital camera 2000 and acquires image data of a photographed still image, including data size of the still image. After the processing in step S510, the cradle apparatus 1000 performs processing for acquiring a real-time image for monitoring.

Then, processing for dividedly acquiring data of the photographed still image is performed. Note that the following processing is performed in an unoccupied time period during the processing for acquiring data of a real-time image for monitoring. First, in step S511, the cradle apparatus 1000 checks if the processing for acquiring one frame of a real-time image for monitoring is currently performed. If, in step S511, it is determined that the processing for acquiring a real-time image for monitoring is currently performed, then in step S512, the cradle apparatus 1000 completes the processing for acquiring one frame of a real-time image in priority. If, in step S511, it is determined that the processing for acquiring a real-time image for monitoring is not currently performed, the processing advances to step S513.

Then, the cradle apparatus 1000 sends a command to the digital camera 2000 for dividedly acquiring the photographed still image data. In step S513, the cradle apparatus 1000 receives divided data of the still image processed according to the command. In step S514, the cradle apparatus 1000 sends the divided data of the acquired still image to the adapter 304 or 305 together with data size of the entire image, size of the sent data, and information about a position of offset from first-sent data.

The cradle apparatus 1000 repeats the processing in step S511 through step S514 until all divided data constituting one still image is completely sent to the adapter 304 or 305. In step S515, when all divided data constituting one still image is completely sent to the adapter 304 or 305, the processing ends.

Figure 9:
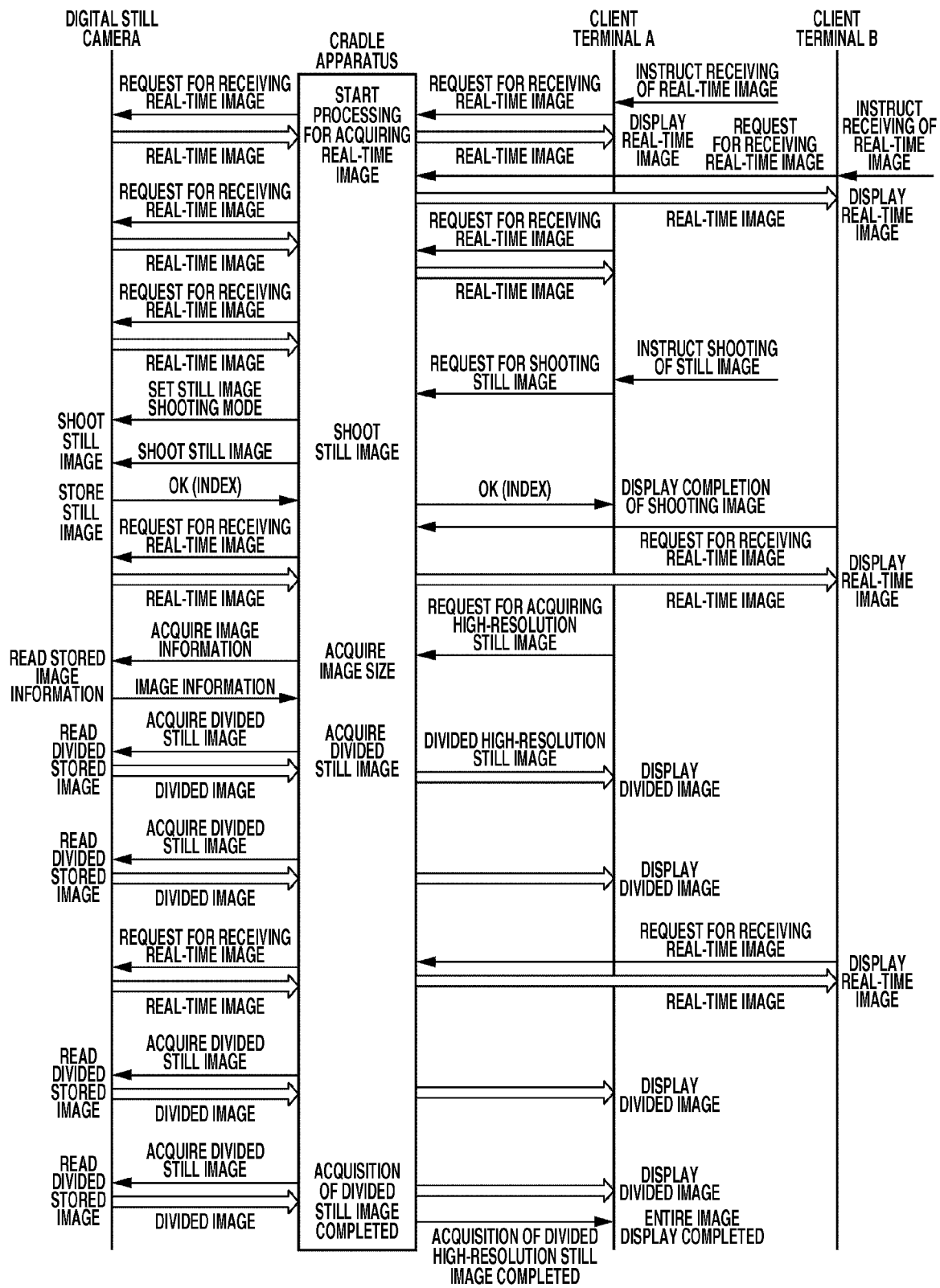
FIG. 9 illustrates an example sequence of a system according to the third exemplary embodiment of the present invention.

FIG. 9 illustrates a sequence specifying the processing according to the third exemplary embodiment. The example shown in FIG. 9 supposes a state in which a moving image session between a client terminal A (the television receiving apparatus 306 and the adapter 304) and a client terminal B (the television receiving apparatus 307 and the adapter 305) is being open. FIG. 9 illustrates sending and receiving of commands and data performed during a time period from detection of the instruction for shooting a still image by the client terminal A during a moving image session to displaying of a high-resolution still image.

In the third exemplary embodiment described above, high-resolution still image data is dividedly acquired in an unoccupied time period during the time for sending a real-time image for monitoring. Accordingly, high-resolution still image data can be sent utilizing an unoccupied time interval without hindering the processing for sending real-time image data for monitoring. In the present exemplary embodiment, the cradle apparatus 1000 simply sends a notification of completion of shooting to a client terminal in response to a request for shooting a still image. However, the configuration can be arranged such that the cradle apparatus 1000 acquires a thumbnail image from the digital camera 2000 and sends the acquired thumbnail image to a client terminal.

Fourth Exemplary Embodiment

In a fourth exemplary embodiment, the setting for each processing mode described in the first through third exemplary embodiments is changed based on a speed of data transfer between the cradle apparatus 1000 and the adapter 304 or 305 and an effective speed of data transfer between the cradle apparatus 1000 and the digital camera 2000. Note that the configuration of the cradle apparatus 1000, the configuration of the digital camera 2000, and the processing for establishing a session for a real-time moving image for monitoring are similar to those described in the first exemplary embodiment. Accordingly, the description thereof is not repeated here.

Figure 10:
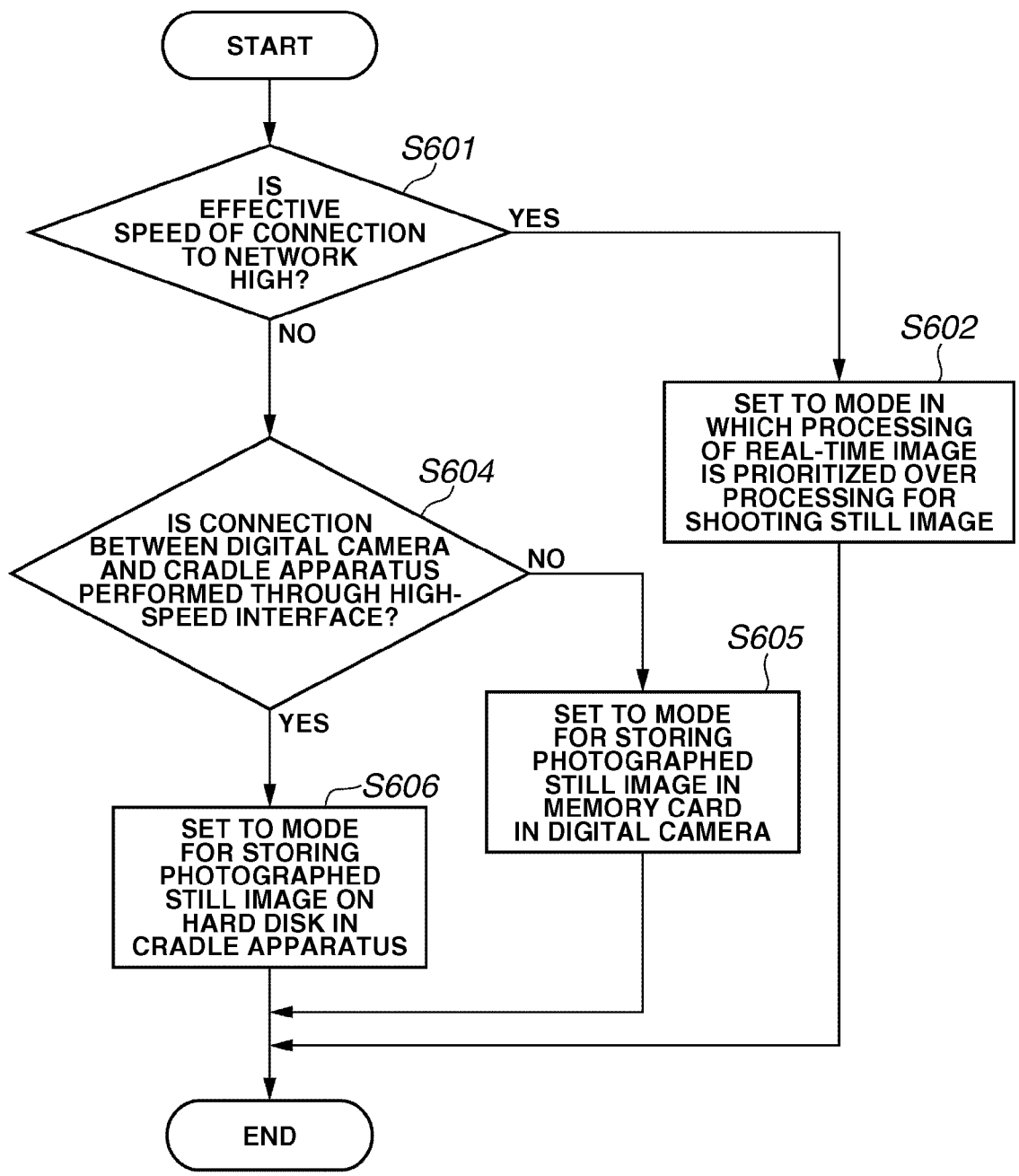
FIG. 10 is a flow chart illustrating an example mode selection processing performed by a cradle apparatus according to a fourth exemplary embodiment of the present invention.

FIG. 10 is a flow chart illustrating example processing for automatically selecting a processing mode, which is performed by the cradle apparatus 1000, according to the fourth exemplary embodiment. The cradle apparatus 1000 repeatedly measures the length of a time period taken from a time of sending a packet to a time of receiving a response between the adapter 304 or 305 and the cradle apparatus 1000, between which a moving image session is open. The cradle apparatus 1000 estimates an effective speed of the network connection based on an average value of the measured length of time (step S601).

If, in step S601, it is determined that the estimated effective speed is equal to or higher than a predetermined value, the cradle apparatus 1000 determines that the connection is a high-speed network connection (YES in step S601), and the processing advances to step S602. In step S602, the cradle apparatus 1000 sets the digital camera 2000 to a processing mode in which the processing of a real-time image for monitoring is prioritized over the processing for shooting a still image.

More specifically, the cradle apparatus 1000 determines that the speed of the network is so high that processing for sending a still image can be performed without suspending the processing for acquiring real-time image data for monitoring. As described in the third exemplary embodiment, the still image shooting processing and the division/sending processing of the photographed still image are performed in an unoccupied time period in which no real-time image data for monitoring is transferred, without suspending a moving image session when the cradle apparatus 1000 receives a still image shooting request.

On the other hand, if the effective speed of the network connection is low (NO in step S601), for example, in the case of a wireless LAN connection, the processing advances to step S604. That is, when the cradle apparatus 1000 receives a request for shooting a still image from the adapter 304 or 305, the cradle apparatus 1000 temporarily suspends the moving image session, and after that, sets the digital camera 2000 to a processing mode described in one of the first and second exemplary embodiments in which the still image shooting processing is performed.

In step S604, the cradle apparatus 1000 acquires information about whether the digital camera 2000 mounted on the cradle apparatus 1000 complies with a standard of connection using a transmission path capable of high-speed transfer using the universal serial bus (USB) 2.0 standard. This information is acquired from the digital camera 2000. In the present exemplary embodiment, the cradle apparatus 1000 complies with the USB 2.0 standard as a standard of data transmission.

If, based on the information acquired in step S604, the cradle apparatus 1000 determines that the digital camera 2000 does not comply with the USB 2.0 standard but complies with the USB 1.1 standard, whose speed is lower than the speed of the USB 2.0 standard (NO in step S604), then the processing advances to step S605. In step S605, the cradle apparatus 1000 sets the digital camera 2000 to a processing mode for storing a photographed high-resolution still image in the SD memory card 207 of the digital camera 2000, as described in the first exemplary embodiment.

In the processing mode set in step S605, the communication between the digital camera 2000 and the cradle apparatus 1000 is estimated as a connection using the USB 1.1 standard, whose speed is low. The cradle apparatus 1000, in such a connection, acquires only thumbnail image data corresponding to the photographed still image data, and then sends the acquired thumbnail image data to the adapter 304 or 305. This processing is performed to avoid taking a long time by acquiring high-resolution still image data from the digital camera 2000.

If it is determined that the connection between the digital camera 2000 and the cradle apparatus 1000 complies with the USB 2.0 standard (YES in step S604), acquisition of still image data is expected to be completed in a short length of time. Accordingly, if it is determined that the connection between the digital camera 2000 and the cradle apparatus 1000 complies with the USB 2.0 standard, then in step S606, the cradle apparatus 1000 issues an instruction for setting the digital camera 2000 to a processing mode in which high-resolution still image data is stored on the hard disk 116 in the cradle apparatus 1000, as described in the second exemplary embodiment. In the processing mode set in step S606, the cradle apparatus 1000 produces a preview image based on the received high-resolution still image and sends the preview image to the adapter 304 or 305.

Fifth Exemplary Embodiment

In a fifth exemplary embodiment, a selection is automatically made among the processing modes described in the first through third exemplary embodiments based on camera capacity information that the cradle apparatus 1000 receives from the digital camera 2000 when the digital camera 2000 is connected to the cradle apparatus 1000. Note that the configuration of the cradle apparatus 1000, the configuration of the digital camera 2000, and the processing for establishing a session for a real time moving image for monitoring are similar to those described in the first exemplary embodiment. Accordingly, the description thereof is not repeated here.

Figure 11:
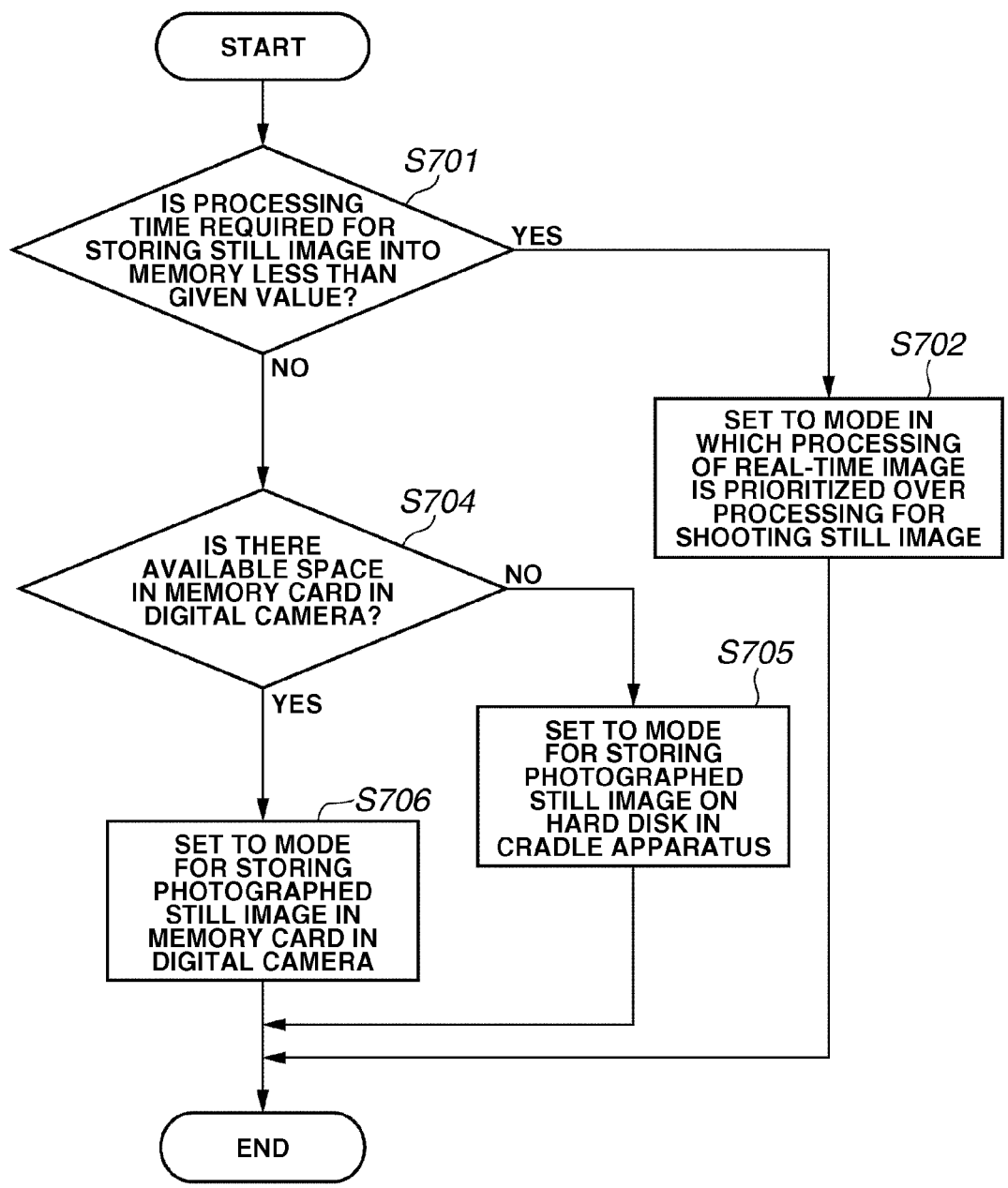
FIG. 11 is a flow chart illustrating an example mode selection processing performed by a cradle apparatus according to a fifth exemplary embodiment of the present invention.

FIG. 11 is a flow chart illustrating example processing for automatically selecting a processing mode, which is performed by the cradle apparatus 1000 according to the fifth exemplary embodiment. Referring to FIG. 11, first, in step S701, the cradle apparatus 1000 determines whether a time required for performing processing for shooting one still image and storing the still image into a memory is less than a given value. In some instances, it is difficult to make this determination. Accordingly, the cradle apparatus 1000 confirms a model name and version information of the digital camera 2000 to determine whether the digital camera 2000 is capable of shooting at a sufficiently high speed. In the fifth exemplary embodiment, the cradle apparatus 1000 previously stores information including a list of model names and version information of the digital camera 2000 capable of shooting at a high speed on the hard disk 116.

If, in step S701, it is determined that the digital camera 2000 is capable of shooting a still image at a high speed (YES in step S701), then in step S702, the cradle apparatus 1000 sets the digital camera 2000 to a processing mode in which the processing for real-time moving image is prioritized over the processing for shooting a still image, as described in the third exemplary embodiment.

On the other hand, if, in step S701, it is determined that the digital camera 2000 is not capable of shooting a still image at a high speed, the processing advances to step S704. In step S704, the cradle apparatus 1000 sends an inquiry command to the digital camera 2000 to check whether there is a space in the SD memory card 207 available for recording the photographed high-resolution still image data.

If, in step S704, it is determined that there is no available space in the SD memory card 207, then in step S705, the cradle apparatus 1000 issues an instruction to the digital camera 2000 for setting the digital camera 2000 to a processing mode in which a photographed still image data is stored on the hard disk 116 in the cradle apparatus 1000, as described in the second exemplary embodiment.

On the other hand, if, in step S704, it is determined that there is an available space in the SD memory card 207, then in step S706, the cradle apparatus 1000 issues an instruction to the digital camera 2000 for setting the digital camera 2000 to a processing mode for storing photographed high-resolution still image data in the SD memory card 207, as described in the first exemplary embodiment.

Sixth Exemplary Embodiment

In a sixth exemplary embodiment, a user makes a selection among the modes described in the first through third exemplary embodiments based on the shooting mode and the setting about a recording format set to the digital camera 2000. Note that the configuration of the cradle apparatus 1000, the configuration of the digital camera 2000, and the processing for establishing a session for a real time moving image for monitoring are similar to those described in the first exemplary embodiment. Accordingly, the description thereof is not repeated here.

Shooting modes that can be set to the digital camera 2000 include a "portrait mode", a "nightscape mode", and a "kids and pets mode", for example. The number and names of selectable shooting modes differ depending on a type of the digital camera 2000. The shooting modes in the digital camera 2000 include a mode for shooting a fast-moving object at a high shutter speed such as the "kids and pets mode" and a "sport mode". In the mode like this, shooting of a still image can be performed in a shorter length of time than a time taken in other modes.

In addition, for a format of recording a still image, there are two formats in a larger sense, namely, Joint Photographic Experts Group (JPEG) format, in which a still image is compressed, and RAW format, in which a still image is not compressed. When a still image is recorded in the RAW format, data size of the photographed data is three to ten or more times larger than the data size of photographed data in the case of the JPEG format.

In the sixth exemplary embodiment, the setting for the processing mode of the cradle apparatus 1000 is automatically selected based on characteristics of the shooting mode and the recording format set to the digital camera 2000.

Figure 12:
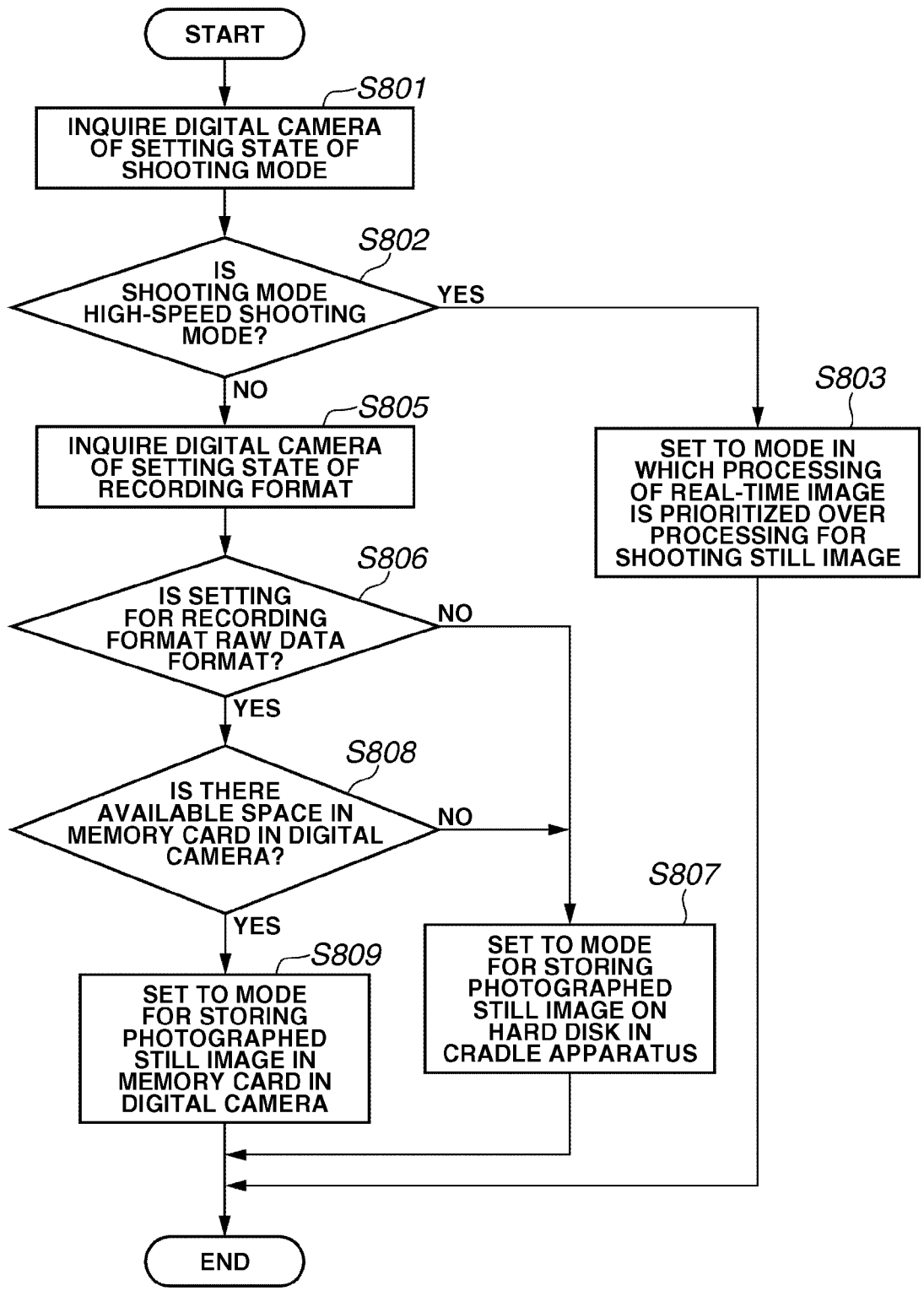
FIG. 12 is a flow chart illustrating an example mode selection processing performed by a cradle apparatus according to a sixth exemplary embodiment of the present invention.

FIG. 12 is a flow chart illustrating processing for selecting a mode, which is performed by the cradle apparatus 1000 according to the sixth exemplary embodiment. Referring to FIG. 12, first, in step S801, the cradle apparatus 1000 sends a command to the digital camera 2000 to inquire the digital camera 2000 of a state of setting of the shooting mode. Then, in step S802, the cradle apparatus 1000 checks a response to the inquiry to determine whether the shooting mode of the digital camera 2000 is set to a high-speed shooting mode such as the "kids and pets mode" or the "sport mode".

If, in step S802, it is determined that the shooting mode of the digital camera 2000 is set to a high-speed shooting mode (YES in step S802), then in step S803, the cradle apparatus 1000 sets the digital camera 2000 to a processing mode in which the processing for a moving image for monitoring is prioritized over the processing for shooting a still image, as described in the third exemplary embodiment. On the other hand, if it is determined that the shooting mode of the digital camera 2000 is not set to a high-speed shooting mode (NO in step S802), the processing advances to step S805.

In step S805, the cradle apparatus 1000 sends a command to the digital camera 2000 to inquire the digital camera 2000 of a state of setting of the recording format of the digital camera 2000. Then, in step S806, the cradle apparatus 1000 checks a response to the inquiry to determine whether the recording format setting is set to the RAW data format for a large data size.

If, in step S806, it is determined that the recording format of the digital camera 2000 is not set to the RAW data format, then in step S807, the cradle apparatus 1000 issues an instruction for setting the digital camera 2000 to a mode for storing a photographed still image on the hard disk 116 in the cradle apparatus 1000, as described in the second exemplary embodiment.

On the other hand, if, in step S806, it is determined that the recording format of the digital camera 2000 is set to the RAW data format (YES in step S806), the processing advances to step S808. In step S808, the cradle apparatus 1000 checks a response to the inquiry command to determine whether there is an available space of capacity necessary for shooting one high-resolution still image in the SD memory card 207 of the digital camera 2000.

If, in step S808, it is determined that there is no available space of capacity necessary for shooting one high-resolution still image in the SD memory card 207 of the digital camera 2000, the processing advances to step S807. In step S807, the cradle apparatus 1000 issues an instruction to the digital camera 2000 for setting the digital camera 2000 to a mode in which a photographed still image is recorded on the hard disk 116 in the cradle apparatus 1000, as described in the second exemplary embodiment.

On the other hand, if, in step S808, it is determined that there is an available space of capacity necessary for shooting one high-resolution still image in the SD memory card 207 of the digital camera 2000, the processing advances to step S809. In step S809, the cradle apparatus 1000 issues an instruction to the digital camera 2000 for setting the digital camera 2000 to the processing mode for storing a photographed still image in the SD memory card 207 of the digital camera 2000, as described in the first exemplary embodiment.

Note that in each of the fourth to sixth exemplary embodiments, the mode for shooting a high-resolution still image is automatically set. However, the configuration is not limited to this. That is, the mode can be previously and manually set via the cradle apparatus 1000 or the adapter 304 or 305 as desired by a user.

Seventh Exemplary Embodiment

In a seventh exemplary embodiment, the setting of the mode is performed based on whether a client terminal, such as the PC 303 and the adapters 304 and 305, that sends a still image shooting request has a control (control authority) for the digital camera 2000. If a client terminal has a control for the digital camera 2000, the cradle apparatus 1000 sends a still image to the client terminal having a control for the digital camera 2000 in priority.

Figure 13:
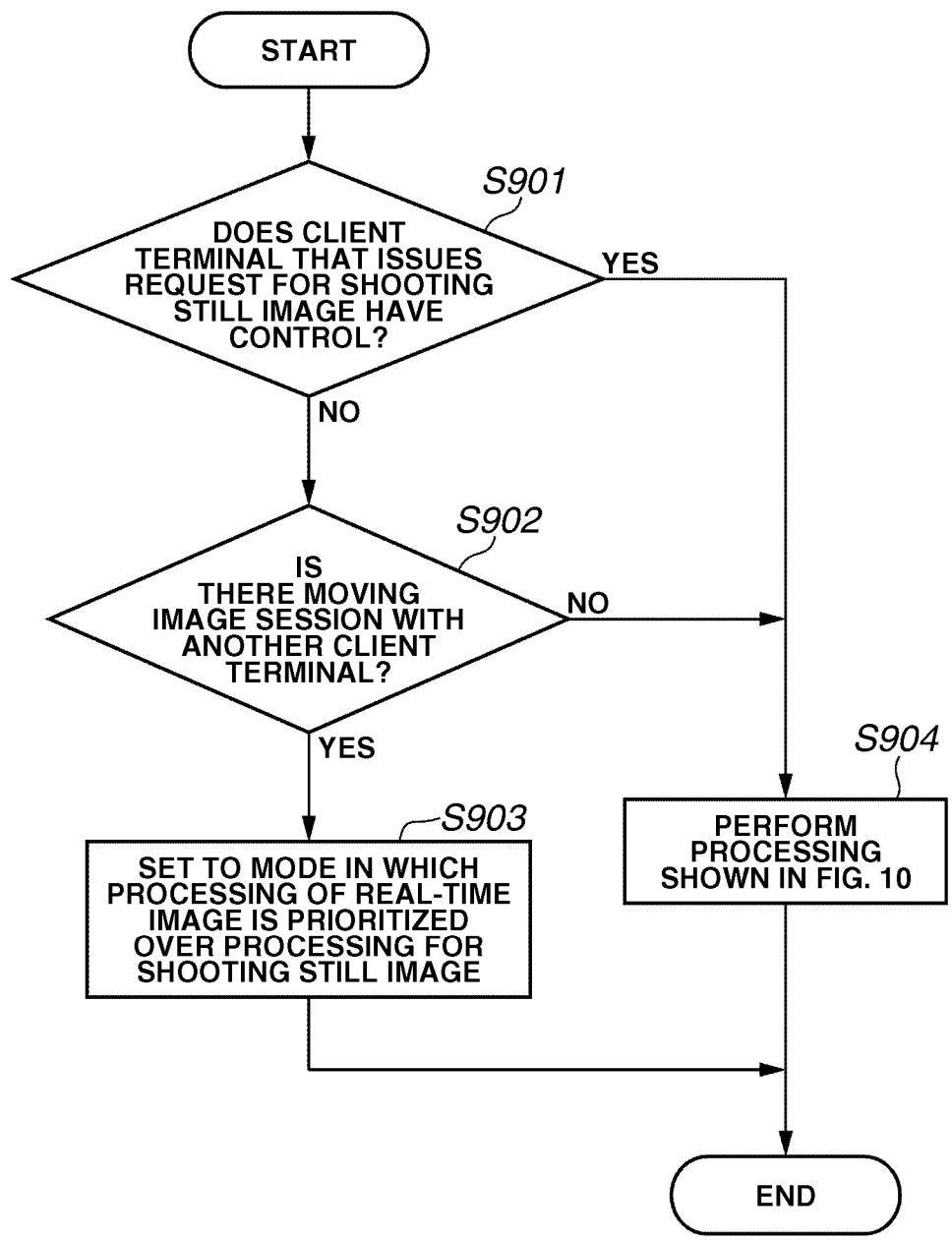
FIG. 13 is a flow chart illustrating an example mode selection processing performed by a cradle apparatus according to a seventh exemplary embodiment of the present invention.

FIG. 13 is a flow chart illustrating processing for selecting a mode, which is performed by the cradle apparatus 1000 according to the seventh exemplary embodiment. Referring to FIG. 13, first, in step S901, when the cradle apparatus 1000 receives a still image shooting request from a client terminal, the cradle apparatus 1000 determines whether the client terminal requesting shooting of a still image has a control for the digital camera 2000. If, in step S901, it is determined that the client terminal requesting shooting of a still image has a control for the digital camera 2000 (YES in step S901), the processing advances to step S904. In step S904, the cradle apparatus 1000 performs the processing shown in FIG. 10.

On the other hand, If, in step S901, it is determined that the client terminal requesting shooting of a still image does not have a control for the digital camera 2000, the processing advances to step S902. In step S902, the cradle apparatus 1000 checks if a moving image session with another client terminal is being open.

If, in step S902, it is determined that no moving image session with another client terminal is being open, the cradle apparatus 1000 performs the still image shooting processing in priority. More specifically, the cradle apparatus 1000 performs the processing shown in FIG. 10. On the other hand, if, in step S902, it is determined that a moving image session with another client terminal is being open, the processing advances to step S903. In step S903, the cradle apparatus 1000 issues an instruction to the digital camera 2000 for setting the digital camera 2000 to a processing mode in which the sending of a real-time image for monitoring is performed in priority.

Eighth Exemplary Embodiment

Figure 14:
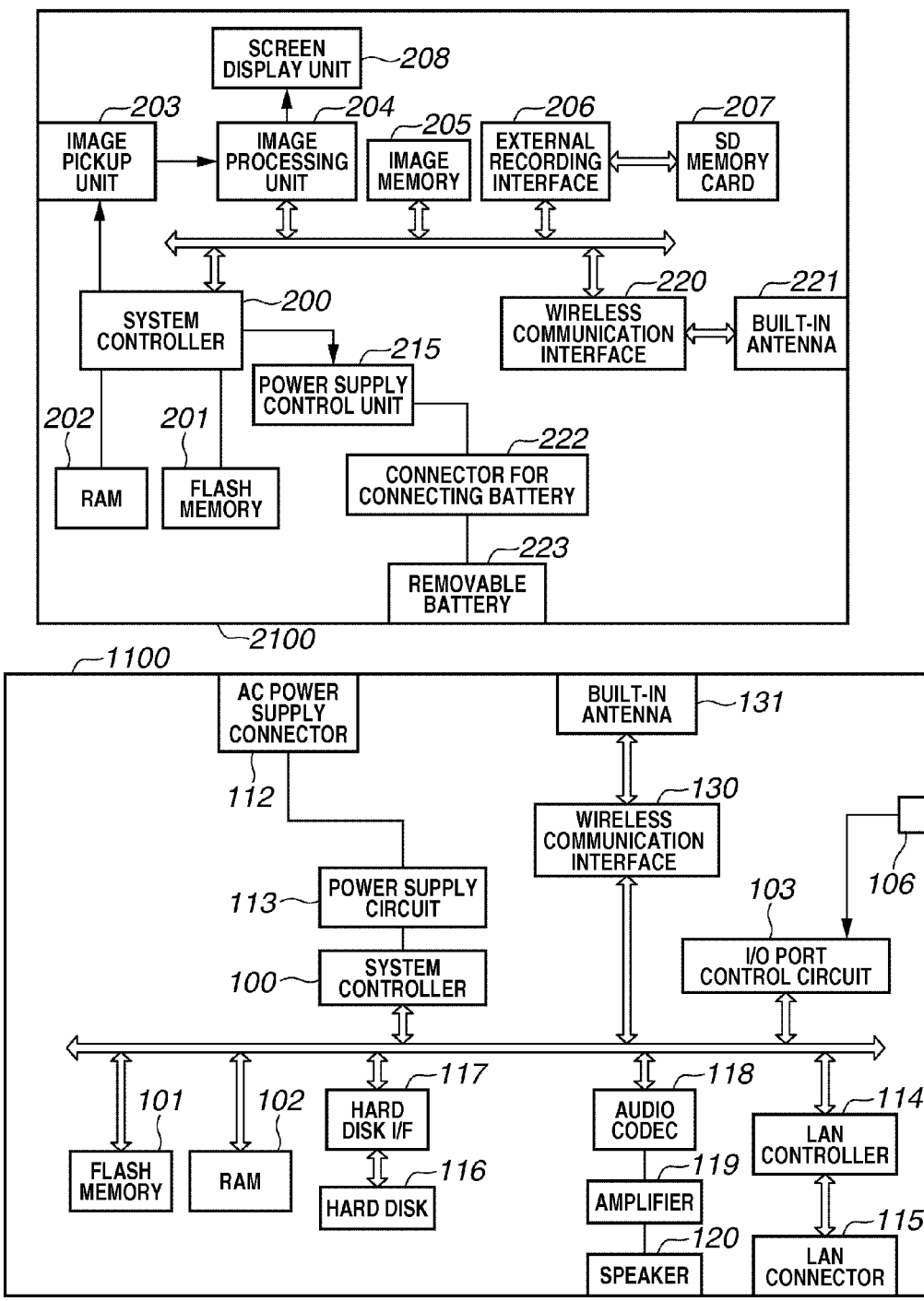
FIG. 14 illustrates an example configuration of a digital camera and a configuration of a camera server according to an eighth exemplary embodiment of the present invention.

In each of the first through seventh exemplary embodiments described above, the digital camera 2000 and the cradle apparatus 1000 are detachably connected physically with each other via a connection connector. In an eighth exemplary embodiment, an image transmission apparatus that sends an image to a client terminal such as an adapter is implemented as a camera server, instead of a camera cradle. FIG. 14 illustrates a digital camera 2100 and a camera server 1100 in a case where a communication between the digital camera 2100 and the camera server 1100 is made by a connection via a wireless network. Note that in FIG. 14, components that are similar to those in FIG. 1 are provided with the same reference numerals, and the description thereof is not repeated here.

Referring to FIG. 14, the digital camera 2100 includes a built-in wireless communication interface 220. The wireless communication interface 220 is an interface for communication with the camera server 1100. The state of the wireless communication can be set to an infrastructure mode via the wireless communication interface 220 using a wireless controller conforming to Institute of Electrical and Electronics Engineers (IEEE) 802.11a standard, for example. A built-in antenna 221 is an antenna for receiving a signal. The digital camera 2100 further includes a battery connection connector 222, a removable battery 223, and a power supply control unit 215.

The camera server 1100 includes a wireless communication interface 130 and a built-in antenna 131 for communicating with the digital camera 2100. The wireless communication interface 130 includes, for example, a wireless controller conforming to IEEE 802.11a standard. The wireless communication interface 130 serves as an access point. The camera server 1100, through the wireless communication interface 130, can connect with at least one digital camera in a wireless communication, independently communicating with the connected digital camera.

Figure 15:
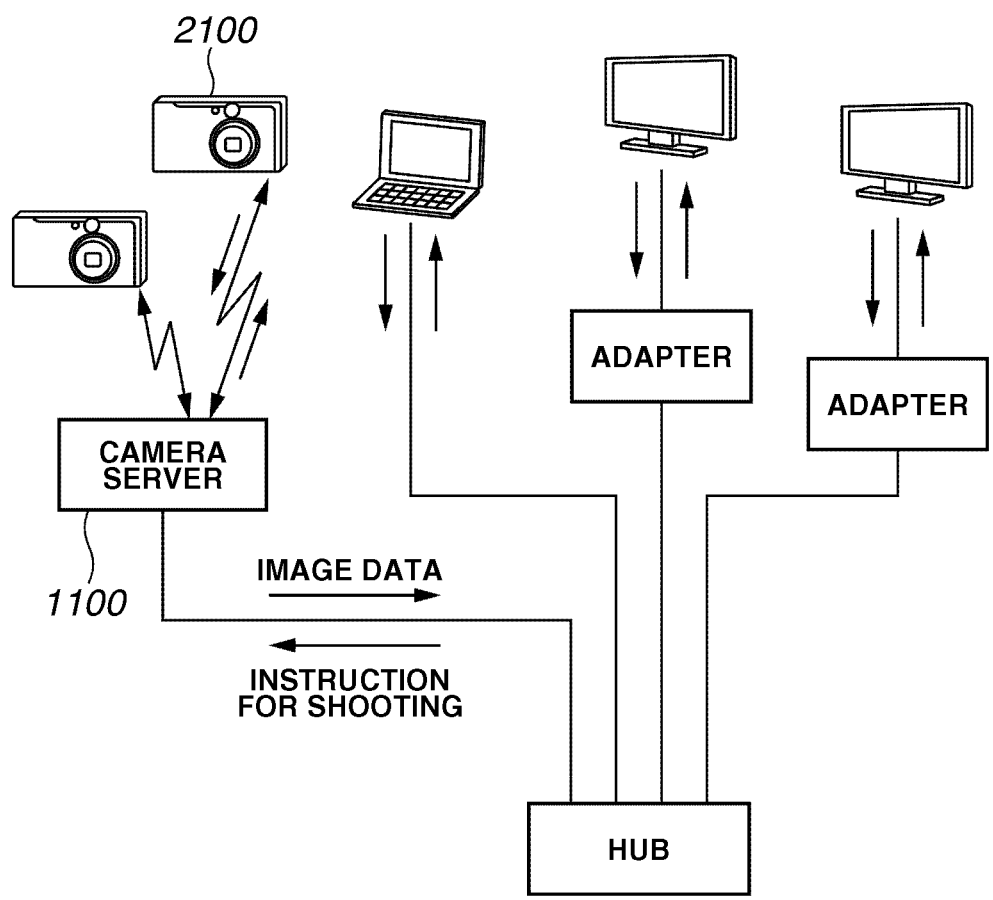
FIG. 15 illustrates an example connection state of the camera server according to the eighth exemplary embodiment of the present invention.

FIG. 15 illustrates an example configuration of a system according to the eighth exemplary embodiment. Referring to FIG. 15, a communication between an adapter (client terminal) and the camera server 1100 is made via a wired network, while a communication between the camera server 1100 and the digital camera 2100 is made via a wireless network. A LAN controller 114 receives a request from a client apparatus. The request received from the client apparatus is processed by a system controller 100. The system controller 100 produces a request packet and sends the request packet to the digital camera 2100 via the wireless communication interface 130. The digital camera 2100 receives the request via the wireless communication interface 220 and performs an operation according to the received request. The digital camera 2100 sends data of a result of the performed operation and a response packet to the camera server 1100 via the wireless communication interface 220. The camera server 1100 analyses the received response packet and the received data. The camera server 1100, if necessary, sends data to the client terminal.

With the above configuration, even in the case where the camera server 1100 and the digital camera 2100 are physically distant from each other, a still image and a real-time image from the digital camera 2100 can be sent to a client terminal without hindrance. Note that for arrangement of requests issued from a plurality of client terminals and a prioritized control between processing of a still image and processing of a real-time image, the method of prioritized control used in the fourth exemplary embodiment, for example, can be used. Accordingly, the description thereof is omitted here.

In the present exemplary embodiment, the wireless communication interface 130 of the camera server 1100 serves as an access point, and a plurality of cameras are connected via a wireless network in an infrastructure mode. However, the configuration is not limited to this. That is, the communication between the camera server 1100 and the digital camera 2100 can be made in an ad hoc mode in which the camera server 1100 and each of the digital cameras 2100 are mutually connected one to one.

In addition, in the present exemplary embodiment, a wireless communication interface is used for the network between the camera server 1100 and the digital camera 2100. However, the configuration is not limited to this. That is, a network cable using a wired interface can be used for the connection between the camera server 1100 and the digital camera 2100. Further, in the case of connecting the camera server 1100 with the digital camera 2100 using a wired cable, the network interface used for the communication with a client terminal can also be used for communication with the digital camera 2100, as double purpose.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-039572 filed Feb. 16, 2006, which is hereby incorporated by reference herein in its entirety.

What is claimed:

1. An image transmission apparatus configured to connect with an image capture unit and configured to transmit an image captured by the image capture unit to a client terminal via a network, the image transmission apparatus comprising:
   a transmission unit configured to transmit a high-resolution version of a still image captured by the image capture unit, a low-resolution version of the still image captured by the image capture unit, and a real-time image captured by the image capture unit having a resolution lower than that of the high-resolution version of the still image;
   a reception unit configured to receive a predetermined instruction from the client terminal; and
   a control unit configured to control the image capture unit and the transmission unit (A) in a case where the reception unit receives the predetermined instruction during the transmission of the real-time image by the transmission unit, such that the transmission unit interrupts the transmission of the real-time image, the transmission unit transmits notification for notifying the client terminal that transmission of the real-time image is interrupted, the image capture unit captures the high-resolution version of the still image, the transmission unit transmits the low-resolution version of the still image acquired from the high-resolution version of the still image to the client terminal, and the transmission unit resumes the transmission of the real-time image after a completion of the transmission of the low-resolution version of the still image to the client terminal, (B) such that the transmission unit transmits the high-resolution version of the still image to the client terminal in a case where the reception unit receives the predetermined instruction while the transmission unit does not transmit the real-time image to the client terminal, and (C) such that the transmission unit transmits the high-resolution version of the still image to the client terminal in a case where the reception unit receives an instruction for acquiring the high-resolution version of the still image, wherein the high-resolution version of the still image is captured by the image capture unit in accordance with the reception of the predetermined instruction during the transmission of the real-time image to the client terminal.

2. The image transmission apparatus according to claim 1, wherein when the predetermined instruction for capturing the still image is received from the client terminal while the transmission unit is transmitting the real-time image, the control unit interrupts the transmission of the real-time image, instructs the image capture unit to capture the still image, transmits the low-resolution version of the still image acquired from the image capture unit to the client terminal, and resumes the transmission of the real-time image after the low-resolution version of the still image is transmitted to the client terminal that has instructed to capture the still image.

3. The image transmission apparatus according to claim 1, wherein when the predetermined instruction for capturing the still image is received from the client terminal while the transmission unit is transmitting the real-time image, the control unit interrupts the transmission of the real-time image, instructs the image capture unit to capture the still image, and produces and transmits the low-resolution version of the still image to the client terminal, and resumes the transmission of the real-time image after the low-resolution version of the still image is transmitted to the client terminal that has instructed to capture the still image.

4. The image transmission apparatus according to claim 2, wherein when it is determined that a speed of the network is lower than a predetermined value and that the image capture unit complies with a standard for performing a lower speed transmission of at least two standards for a transmission path, the control unit interrupts the transmission of the real-time image, instructs the image capture unit to capture the still image, transmits the low-resolution version of the still image to the client terminal, and resumes the transmission of the real-time image after the low-resolution version of the still image is transmitted to the client terminal that has instructed to capture the still image.

5. The image transmission apparatus according to claim 3, wherein when it is determined that a speed of the network is lower than a predetermined value and that the image capture apparatus complies with a standard for performing a higher speed transmission of at least two standards for a transmission path, the control unit interrupts the transmission of the real-time image, instructs the image capture unit to capture the still image, produces and transmits the low-resolution version of the still image to the client terminal, and resumes the transmission of the real-time image after the low-resolution version of the still image is transmitted to the client terminal that has instructed to capture the still image.

6. The image transmission apparatus according to claim 1, wherein when it is determined that a speed of the network is higher than a predetermined value, the control unit instructs the image capture unit to capture the still image, and transmits the real-time image and each of plural parts of the still image time-serially to the client terminal that has instructed to capture the still image.

7. An image transmission method for an image transmission apparatus configured to connect with an image capture unit and configured to transmit an image captured by the image capture unit to a client terminal via a network, the image transmission method comprising:
   transmitting a high resolution version of a still image captured by the image capture unit, a low resolution version of the still image captured by the image capture unit, and a real-time image captured by the image capture unit and having a resolution lower than that of the high resolution version of the still image;
   receiving a predetermined instruction from the client terminal; and controlling the image capture unit and transmitting, (A) in a case where, during the transmission of the real-time image, he predetermined instruction is received, such that the transmission of the real-time image is interrupted, interruption of the real-time image transmission is notified to the client terminal, the image capture unit captures the high-resolution version of the still image, the low resolution version of the still image acquired from the high-resolution version of the still image is transmitted to the client terminal, and the transmission of the real-image is resumed after a completion of the transmission of the low-resolution version of the still image to the client terminal, (B) such that the high resolution version of the still image is transmitted to the client terminal in a case where the image transmission apparatus receives the predetermined instruction while the real-time image is not transmitted to the client terminal, and (C) such that the high-resolution version of the still image captured by the image capture unit is transmitted to the client terminal in a case where an instruction for acquiring the high-resolution version of the still image is received, wherein the high-resolution version of the still image is captured in accordance with the reception of the predetermined instruction during the transmission of the real-time image.

8. A non-transitory computer-readable medium containing computer-executable instructions for performing an image transmission with an image transmission apparatus configured to connect with an image capture unit and configured to transmit an image captured by the image capture unit to a client terminal via a network, the computer readable medium comprising:

computer-executable instructions for transmitting a high resolution version of a still image capture by the image capture unit, a low resolution version of the still image captured by the image capture unit, and a real-time image captured by the image capture and having a resolution lower than that of the high resolution version of the still image;

computer-executable instructions for receiving a-predetermined instruction from the client terminal; and computer-executable instructions for controlling the image capture unit and the transmitting, (A) in a case where, during the transmission of the real-time image, the predetermined instruction is received, such that the transmission of the real-time image is interrupted, interruption of the real-time image transmission is notified to the client terminal, the image capture unit captures the high-resolution version of the still image, the low resolution version of the still image acquired from the high-resolution version of the still image is transmitted to the client terminal, and the transmission of the real-image is resumed after a completion of the transmission of the low-resolution version of the still image to the client terminal, (B) such that the high resolution version of the still image is transmitted to the client terminal in a case where the image transmission apparatus receives the predetermined instruction while the real-time image is not transmitted to the client terminal, and (C) such that the high-resolution version of the still image captured by the image capture unit is transmitted to the client terminal in a case where an instruction for acquiring the high-resolution version of the still image is received, wherein the high-resolution version of the still image is captured in accordance with the reception of the predetermined instruction during the transmission of the real-time image.

9. The image transmission apparatus according to claim 1, wherein the control unit controls the image capture unit to store the still image into a memory card in the case where the reception unit receives, during the transmission of the real-time image by the transmission unit, the instruction for capturing the still image.

10. The method according to claim 7, wherein the image capture unit is controlled to store the still image into a memory card in the case where, during the transmission of the real-time image, the instruction for capturing the still image is received.

11. The medium according to claim 8, wherein the image capture unit is controlled to store the still image into a memory card in the case where, during the transmission of the real-time image, the instruction for capturing the still image is received.

* * * * *